United States Patent
Maturana et al.

(10) Patent No.: US 9,971,317 B2
(45) Date of Patent: May 15, 2018

(54) CLOUD-LEVEL INDUSTRIAL CONTROLLER LOOP GAIN TUNING BASED ON INDUSTRIAL APPLICATION TYPE

(71) Applicant: Rockwell Automation Technologies, Inc., Mayfield Heights, OH (US)

(72) Inventors: Francisco P. Maturana, Lyndhurst, OH (US); Juan L. Asenjo, Timberlake, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 415 days.

(21) Appl. No.: 14/525,149

(22) Filed: Oct. 27, 2014

(65) Prior Publication Data

US 2015/0277399 A1 Oct. 1, 2015

Related U.S. Application Data

(60) Provisional application No. 61/970,798, filed on Mar. 26, 2014.

(51) Int. Cl.
  *G05B 13/04* (2006.01)
  *G06F 9/50* (2006.01)

(52) U.S. Cl.
  CPC ........ *G05B 13/042* (2013.01); *G06F 9/5072* (2013.01)

(58) Field of Classification Search
  None
  See application file for complete search history.

(56) References Cited

U.S. PATENT DOCUMENTS 5,519,605 A * 5/1996 Cawlfield ............ G05B 13/048
  700/31
6,230,010 B1   5/2001 Morris
  (Continued)

FOREIGN PATENT DOCUMENTS

CN   1755564   4/2006
CN   1937559   3/2007
  (Continued)

OTHER PUBLICATIONS

Extended European Search Report for EP Application Serial No. 15160989.8, dated Sep. 22, 2016, 5 pages.
(Continued)

*Primary Examiner* — Mohammad Ali
*Assistant Examiner* — Bernard G Lindsay
(74) *Attorney, Agent, or Firm* — Amin, Turocy & Watson, LLP

(57) ABSTRACT

A control loop tuning system executing on a cloud platform facilitate remote control system analysis and generation of suitable controller gains for a given closed-loop control application. The system leverages cloud-side analytics and a gain correlation model generated based on historical data collected from the industrial control system and maintained on cloud storage. The gain correlation model creates a virtual association between controller gains and process variables based on operational and configuration data collected from the industrial control system. The system then applies iterative analytics to the model to converge on a set of controller gains determined to satisfy an optimization criterion. The recommended controller gains are then provided to a client device for review and implementation in the real system controller.

20 Claims, 16 Drawing Sheets

(56) References Cited

U.S. PATENT DOCUMENTS

| | | |
|---|---|---|
| 6,609,034 B1 | 8/2003 | Behrens et al. |
| 6,640,241 B1 | 10/2003 | Ozzie et al. |
| 6,675,226 B1 | 1/2004 | Nair et al. |
| 7,133,908 B1 | 11/2006 | Pajak et al. |
| 7,159,209 B1 | 1/2007 | Srinivasan et al. |
| RE39,989 E | 1/2008 | Morris |
| 7,676,287 B2 | 3/2010 | Eryurek et al. |
| 8,219,216 B2 | 7/2012 | Klug et al. |
| 8,275,847 B2 | 9/2012 | Lewis |
| 2001/0053992 A1 | 12/2001 | Eto et al. |
| 2002/0133270 A1 | 9/2002 | Hung et al. |
| 2002/0178159 A1 | 11/2002 | O'Brien |
| 2003/0014387 A1 | 1/2003 | Kreidler et al. |
| 2003/0083754 A1 | 5/2003 | Tripathi et al. |
| 2003/0212818 A1 | 11/2003 | Klein et al. |
| 2004/0141517 A1 | 7/2004 | Balasubramanian et al. |
| 2004/0230859 A1 | 11/2004 | Cochran et al. |
| 2005/0010333 A1 | 1/2005 | Lorton et al. |
| 2005/0154477 A1* | 7/2005 | Martin .......... G05B 17/02 700/37 |
| 2005/0193285 A1 | 9/2005 | Jeon |
| 2006/0068762 A1 | 3/2006 | Baldwin et al. |
| 2006/0294047 A1 | 12/2006 | Johnston et al. |
| 2007/0019641 A1* | 1/2007 | Pai .......... H04L 29/06 370/389 |
| 2008/0027704 A1 | 1/2008 | Kephart et al. |
| 2008/0168092 A1 | 7/2008 | Boggs et al. |
| 2008/0317058 A1 | 12/2008 | Williams |
| 2009/0089227 A1* | 4/2009 | Sturrock .......... G05B 17/02 706/12 |
| 2009/0183201 A1 | 7/2009 | Dasgupta |
| 2009/0198350 A1 | 8/2009 | Thiele |
| 2009/0265036 A1 | 10/2009 | Jamieson et al. |
| 2009/0326892 A1 | 12/2009 | Lin |
| 2010/0070852 A1 | 3/2010 | Li |
| 2010/0256794 A1 | 10/2010 | McLaughlin et al. |
| 2010/0256795 A1 | 10/2010 | McLaughlin et al. |
| 2010/0257228 A1 | 10/2010 | Staggs et al. |
| 2011/0066298 A1 | 3/2011 | Francino |
| 2011/0103393 A1 | 5/2011 | Meier et al. |
| 2011/0134930 A1 | 6/2011 | McLaren et al. |
| 2011/0145836 A1 | 6/2011 | Wheeler et al. |
| 2011/0264622 A1 | 10/2011 | Vargas et al. |
| 2012/0143378 A1 | 6/2012 | Spears et al. |
| 2012/0144202 A1 | 6/2012 | Counterman |
| 2012/0166963 A1 | 6/2012 | Kohli et al. |
| 2012/0232869 A1 | 9/2012 | Maturana et al. |
| 2012/0331104 A1 | 12/2012 | Akiyama et al. |
| 2013/0067090 A1 | 3/2013 | Batrouni et al. |
| 2013/0081146 A1 | 3/2013 | Hakozaki |
| 2013/0110298 A1 | 5/2013 | Beveridge |
| 2013/0123965 A1 | 5/2013 | Cooper et al. |
| 2013/0124253 A1 | 5/2013 | Cooper et al. |
| 2013/0150986 A1 | 6/2013 | Timsjo et al. |
| 2013/0191106 A1* | 7/2013 | Kephart .......... G05B 17/02 703/21 |
| 2013/0211559 A1 | 8/2013 | Lawson et al. |
| 2013/0211870 A1 | 8/2013 | Lawson et al. |
| 2013/0212420 A1 | 8/2013 | Lawson et al. |
| 2013/0225151 A1 | 8/2013 | King et al. |
| 2013/0227446 A1 | 8/2013 | Zala et al. |
| 2013/0262678 A1 | 10/2013 | Tung et al. |
| 2013/0266193 A1 | 10/2013 | Tiwari et al. |
| 2013/0269020 A1 | 10/2013 | Griffin et al. |
| 2013/0283151 A1 | 10/2013 | Deguzman et al. |
| 2013/0290952 A1 | 10/2013 | Childers, Jr. |
| 2014/0047064 A1 | 2/2014 | Maturana et al. |
| 2014/0047107 A1 | 2/2014 | Maturana et al. |
| 2014/0115592 A1* | 4/2014 | Frean .......... G06F 9/5027 718/102 |
| 2014/0156234 A1 | 6/2014 | Maturana et al. |
| 2014/0164124 A1 | 6/2014 | Rhoads |
| 2014/0207868 A1 | 7/2014 | Gordon et al. |
| 2014/0257528 A1* | 9/2014 | Perez .......... G05B 13/042 700/46 |
| 2014/0269531 A1 | 9/2014 | Luna et al. |
| 2014/0274005 A1 | 9/2014 | Luna et al. |
| 2014/0280796 A1 | 9/2014 | Pijewski |
| 2014/0282015 A1* | 9/2014 | Nixon .......... G05B 11/01 715/733 |
| 2014/0337473 A1 | 11/2014 | Frusina et al. |
| 2015/0220080 A1 | 8/2015 | Nixon et al. |

FOREIGN PATENT DOCUMENTS

| | | |
|---|---|---|
| CN | 103293953 | 9/2013 |
| CN | 203466840 | 3/2014 |
| CN | 103701953 A | 4/2014 |
| EP | 1422619 | 5/2004 |
| EP | 2228965 | 9/2010 |
| EP | 2541354 | 1/2013 |
| EP | 2592812 | 5/2013 |
| EP | 2660667 | 11/2013 |
| EP | 2704401 | 3/2014 |

OTHER PUBLICATIONS

Extended European Search Report for EP Application Serial No. 15160988.0, dated Sep. 16, 2016, 9 pages.
European Office Action for EP Application Serial No. 15160941.9, dated Aug. 29, 2016, 2 pages.
European Office Action for EP Application Serial No. 15160980.7, dated Sep. 5, 2016, 2 pages.
Office Action for U.S. Appl. No. 14/525,131, dated Oct. 4, 2016, 56 pages.
Office Action for U.S. Appl. No. 14/634,174, dated Nov. 4, 2016, 25 pages.
European Office Action for EP Application Serial No. 15160988.0, dated Oct. 24, 2016, 2 pages.
Extended European Search Report for EP Application Serial No. 15160984.9, dated Jul. 4, 2016, 10 pages.
European Office Action for EP Application Serial No. 15160984.9, dated Aug. 8, 2016, 2 pages.
Extended European Search Report for EP Application Serial No. 15160944.3, dated Jul. 8, 2016, 9 pages.
European Office Action for EP Application Serial No. 15160944.3, dated Aug. 16, 2016, 2 pages.
Extended European Search Report for EP Application Serial No. 15160868.4, dated Jun. 29, 2016, 11 pages.
European Office Action for EP Application Serial No. 15160868.4, dated Aug. 1, 2016, 2 pages.
Extended European Search Report for EP Application Serial No. 15160980.7, dated Jul. 28, 2016, 10 pages.
Extended European Search Report for EP Application Serial No. 15160924.5, dated Jul. 14, 2016, 10 pages.
European Office Action for EP Application Serial No. 15160924.5, dated Aug. 22, 2016, 2016, 2 pages.
Extended European Search Report for EP Application Serial No. 15160941.9, dated Jul. 27, 2016, 12 pages.
Extended European Search Report for EP Application Serial No. 15160987.2, dated Jul. 11, 2016, 9 pages.
European Office Action for EP Application Serial No. 15160987.2, dated Aug. 16, 2016, 2 pages.
Office Action for U.S. Appl. No. 14/525,131, dated Jun. 28, 2016, 36 pages.
Office Action for U.S. Appl. No. 14/665,128, dated Jul. 20, 2016, 9 pages.
Office Action for U.S. Appl. No. 14/634,174, dated Aug. 4, 2016, 11 pages.
Steiner, J. G., et al., "Kerberos: An Authentication Service for Open Network Systems," Proceedings of the Winter Usenix Conference, Feb. 9, 1988, pp. 191-202.
Office Action from U.S. Appl. No. 14/525,144, dated Sep. 9, 2016, 28 pages.
Office Action for U.S. Appl. No. 14/562,233, dated Jan. 25, 2017, 25 pages.

(56) References Cited

OTHER PUBLICATIONS

Office Action for U.S. Appl. No. 14/639,279, dated Feb. 10, 2017, 110 pages.
Office Action for U.S. Appl. No. 14/525,131, dated Feb. 3, 2017, 21 pages.
Office Action for U.S. Appl. No. 14/525,144, dated Feb. 3, 2017, 42 pages.
Office Action for U.S. Appl. No. 14/634,174, dated Feb. 3, 2017, 12 pages.
Office Action for Chinese Application No. 201510136419.4, dated Apr. 21, 2017, 10 pages.
Office Action for Chinese Application No. 201510135130.0, dated May 3, 2017, 15 pages.
Office Action for U.S. Appl. No. 14/478,974, dated Jun. 15, 2017, 11 pages.
Office Action for U.S. Appl. No. 14/619,933 dated May 15, 2017, 11 pages.
Office Action for Chinese Application No. 201510138371.0 dated May 4, 2017, 15 pages.
Final Office Action for U.S. Appl. No. 14/562,233, dated Jul. 28, 2017, 33 pages.
Final Office Action for U.S. Appl. No. 14/639,279, dated Aug. 9, 2017, 66 pages.
Office Action for U.S. Appl. No. 14/639,279 dated Nov. 15, 2017, 75 pages.
Office Action for U.S. Appl. No. 14/562,233 dated Dec. 29, 2017, 36 pages.
Office Action for Chinese Application Serial No. 201510138371.0 dated Nov. 14, 2017, 5 pages.
Office Action for U.S. Appl. No. 15/431,128 dated Oct. 18, 2017, 37 pages.
Chinese Office Action and English Translation thereof dated Jul. 12, 2017, for Chinese Application Serial No. 201510138210.1, 17 pages.
European Office Action for European Application Serial No. 15160984.9 dated Feb. 15, 2018, 7 pages.

\* cited by examiner

1

CLOUD-LEVEL INDUSTRIAL CONTROLLER LOOP GAIN TUNING BASED ON INDUSTRIAL APPLICATION TYPE

CROSS-REFERENCE TO RELATED APPLICATIONS

This application claims priority to U.S. Provisional Application Ser. No. 61/970,798, filed on Mar. 26, 2014, entitled "INDUSTRIAL CLOUD INFRASTRUCTURE FOR DATA INGESTION, MODELING, PROCESSING, ANALYTICS, AND REPORTING," the entirety of which is incorporated herein by reference.

BACKGROUND

The subject matter disclosed herein relates generally to industrial control systems, and, more particularly, to a cloud-based control loop tuning system that generates recommended controller gain values based on collection and analysis of operational and configuration data from an industrial control system.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for tuning controller gain values on a cloud platform is provided, comprising a system interface component configured to collect industrial data from a set of devices comprising an industrial control system and store the industrial data on a cloud platform; a gain modeling component configured to generate a gain correlation model based on analysis of the industrial data and store the gain correlation model on the cloud platform, wherein the gain correlation model defines at least one correlation between controller gain values and process variables of the industrial control system; and a correlation analytics component configured to determine at least one controller gain value for the industrial control system based on analysis of the gain correlation model.

Also, one or more embodiments provide a method for tuning a control loop, comprising receiving, at a cloud platform by a system comprising at least one processor, industrial data from one or more industrial devices of an industrial control system; creating, by the system, a gain correlation model based on analysis of the industrial data and storing the gain correlation model on cloud storage of the cloud platform, wherein the gain correlation model encodes at least one correlation between controller gain values and process variables of the industrial control system; and determining, by the system, at least one controller gain value for the industrial control system based on an analysis of the gain correlation model.

Also, according to one or more embodiments, a non-transitory computer-readable medium is provided having stored thereon instructions that, in response to execution, cause a system to perform operations, the operations, comprising receiving, via a cloud platform, industrial data from one or more industrial devices of an industrial control system; generating a gain correlation model based on analysis of the industrial data and storing the gain correlation model on cloud storage of the cloud platform, wherein the gain correlation model defines at least one correlation between controller gain values and process variables of the industrial control system; and generating at least one controller gain value for the industrial control system based on an analysis of the gain correlation model.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
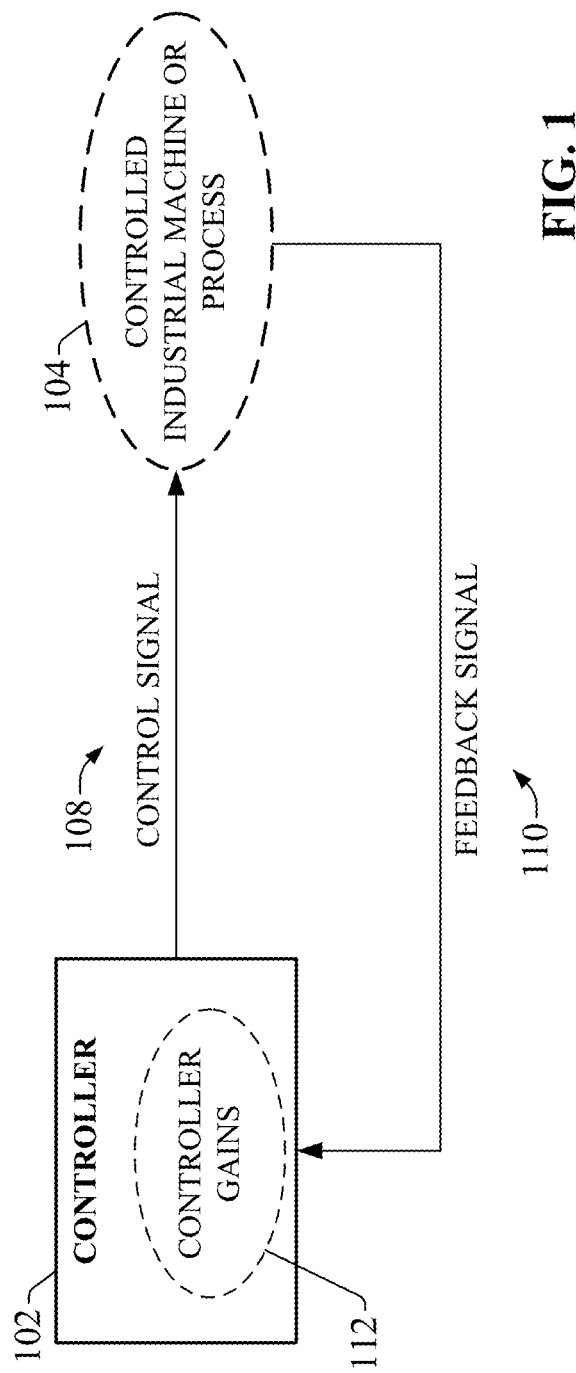
FIG. 1 is a block diagram of a simplified closed-loop control architecture.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Many industrial automation applications include closed-loop control systems—such as PID (proportional-integral-derivative) control loop systems—to control position or velocity of motion devices in motion control systems, or to regulate process variables of an industrial process. For example, motion control systems typically include one or more motors or other motion devices operating under the supervision of an industrial controller, which sends position or speed control instructions to the motor in accordance with a control program. In a closed-loop configuration, the controller instructs the motion device to move to a target position or to transition to a target velocity (a desired state) and receives feedback information indicating an actual state of the motor. The controller monitors the feedback information to determine whether the motor has reached the target position or velocity, and adjusts the control signal to correct errors between the actual state and the desired state.

Similar closed-loop control techniques are also used in process control applications. In such applications, the control signal generated by the controller regulates one or more process variables in accordance with a control algorithm, and a measured value of the process variable is provided to the controller as feedback, allowing the controller to adjust the control signal as needed based on the actual value of the process variable relative to a desired setpoint.

FIG. 1 is a block diagram of a simplified closed-loop control architecture. Controller 102 is programmed to control an industrial machine or process 104. In an example application, the controlled system may comprise a motor-controlled axis of a robot or positioning system. In such applications, controller 102 sends control signal 108 instructing the motor to move an associated mechanical load to a desired position at a desired speed. The control signal 108 can be provided directly to the motor, or to a motor drive that controls the power delivered to the motor (and consequently the speed or position and direction of the motor). Feedback signal 110 indicates a current state (e.g., position, velocity, etc.) of the motor and/or load in real-time. In servo-driven systems, feedback signal 110 can be generated, for example, by an encoder or resolver (not shown) that tracks an absolute or relative position of the motor. In other types of systems, feedback signal 110 may originate from the load (e.g., via measurement of the load's position or speed). During a move operation, the controller monitors feedback signal 110 to ensure that the load has accurately reached the target position. The controller 102 compares the actual position of the load as indicated by the feedback signal 110 with the target position, and adjusts the control signal 108 as needed to reduce or eliminate error between the actual and target positions.

In another example application, the controlled system may comprise a spinning load (e.g., a pump, spin dryer, a washing machine, a centrifuge, etc.) driven by a motor, in which controller 102 controls the rotational velocity of the load. In this example, controller 102 provides an instruction to the motor (via control signal 108) to transition from a first velocity to a second velocity, and makes necessary adjustments to the control signal 108 based on feedback signal 110.

It is to be appreciated that the techniques described herein are not limited to use in the example types of motion control systems described above, but rather are applicable to substantially any type of motion control application, including but not limited to conveyor control, material handling (e.g., pick-and-place systems and the like), palletizer systems, web tension control, and other types of motion systems. The techniques described herein are also applicable in process control systems, in which controller 102 regulates one or more process variables (e.g., temperature, pressure, flow, tank levels, etc.) of an industrial process. Applicable process control applications include, but are not limited to, batch control applications (e.g., plastics, glass, paper, etc.), power control, waste water processing, oil refinement, etc.

The control signal output generated by the controller 102 in response to an error between the desired position or velocity and the target position or velocity (as reported by the feedback signal 110) depends on the values of the controller gains 112 set for the control loop. Designers of motion control and process control systems seek to achieve an optimal trade-off between performance and system stability. For example, an aggressively tuned controller may result in a system that tracks a desired position with high accuracy and a fast response time, but may be cause undesirable oscillation in response to disturbances or setpoint changes. These oscillations can introduce instability, cause response delays, or consume excessive power as a result of the additional work required to bring the system to a stable state. Alternatively, tuning the controller more conservatively will yield a more stable (e.g., less oscillatory) system, but at the expense of response time. Ideally, the controller gains should be selected to optimize this trade-off between performance and system stability. The process of selecting suitable gains for the controller is known as tuning. Selection of controller gain values determines the responsiveness of the controlled system to changes in the control signal.

Design engineers must often employ a trial-and-error approach to identifying suitable controller gains, since suitable gain selection depends on physical characteristics of the system or process being controlled. The controller gains are typically set via a program development interface executing on a client device (e.g., a laptop computer or other client device) that is locally connected to the controller.

In order to simplify the process of setting suitable controller gain values for a specific motion or process control application, one or more embodiments of the present disclosure provide a control loop tuning system that executes on a cloud platform. The cloud-based control loop tuning system automatically identifies suitable controller gains for a given motion or process control application by leveraging cloud-side analytics and a gain correlation model generated based on historical data collected and maintained on cloud storage (e.g., big data storage). The gain correlation model creates a virtual association between controller gains and process variables based on operational data collected for the on-premise motion or process control system. To this end, the cloud-based tuning system monitors process variables and/or other operational data for the on-premise motion or process control system, and incrementally builds a high-fidelity model of the controlled machine or process over time as new system data is collected into the cloud. The controller tuning system can apply iterative analytics to the model until a set of controller gains are converged upon that satisfy a defined optimization criterion, and provide the calculated controller gains to a user's client device, or directly to the controller on the plant floor. Thus, the controller gain tuning system described herein mitigates the need to tune the controller manually using trial-and-error methods by leveraging big data analysis and machine modeling in the cloud platform to automatically generate suitable controller gains for a given industrial control application. Moreover, since the controller tuning system executes on a cloud platform as a generic tuning system, the cloud-based tuning functionality can be provided as a service that is globally accessible to different end users regardless of location.

To illustrate an example cloud architecture that can be used to provide cloud-based controller tuning services, an example high-level overview of an industrial enterprise that leverages cloud-based services is now described in connection with FIG. 2. The enterprise comprises one or more industrial facilities 204, each having a number of industrial devices 208 and 210 in use. The industrial devices 208 and 210 can make up one or more automation systems (e.g., motion control systems, process control systems, etc.) operating within the respective facilities 204. Example automation systems can include, but are not limited to, batch control systems (e.g., mixing systems), continuous control systems (e.g., PID control systems), or discrete control systems. Industrial devices 208 and 210 can include such devices as industrial controllers (e.g., programmable logic controllers or other types of programmable automation controllers); field devices such as sensors and meters; motor drives; operator interfaces (e.g., human-machine interfaces, industrial monitors, graphic terminals, message displays, etc.); industrial robots, barcode markers and readers; vision system devices (e.g., vision cameras); smart welders; or other such industrial devices.

Example automation systems can include one or more industrial controllers that facilitate monitoring and control of their respective processes. The controllers exchange data with the field devices using native hardwired I/O or via a plant network such as EtherNet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Figure 2:
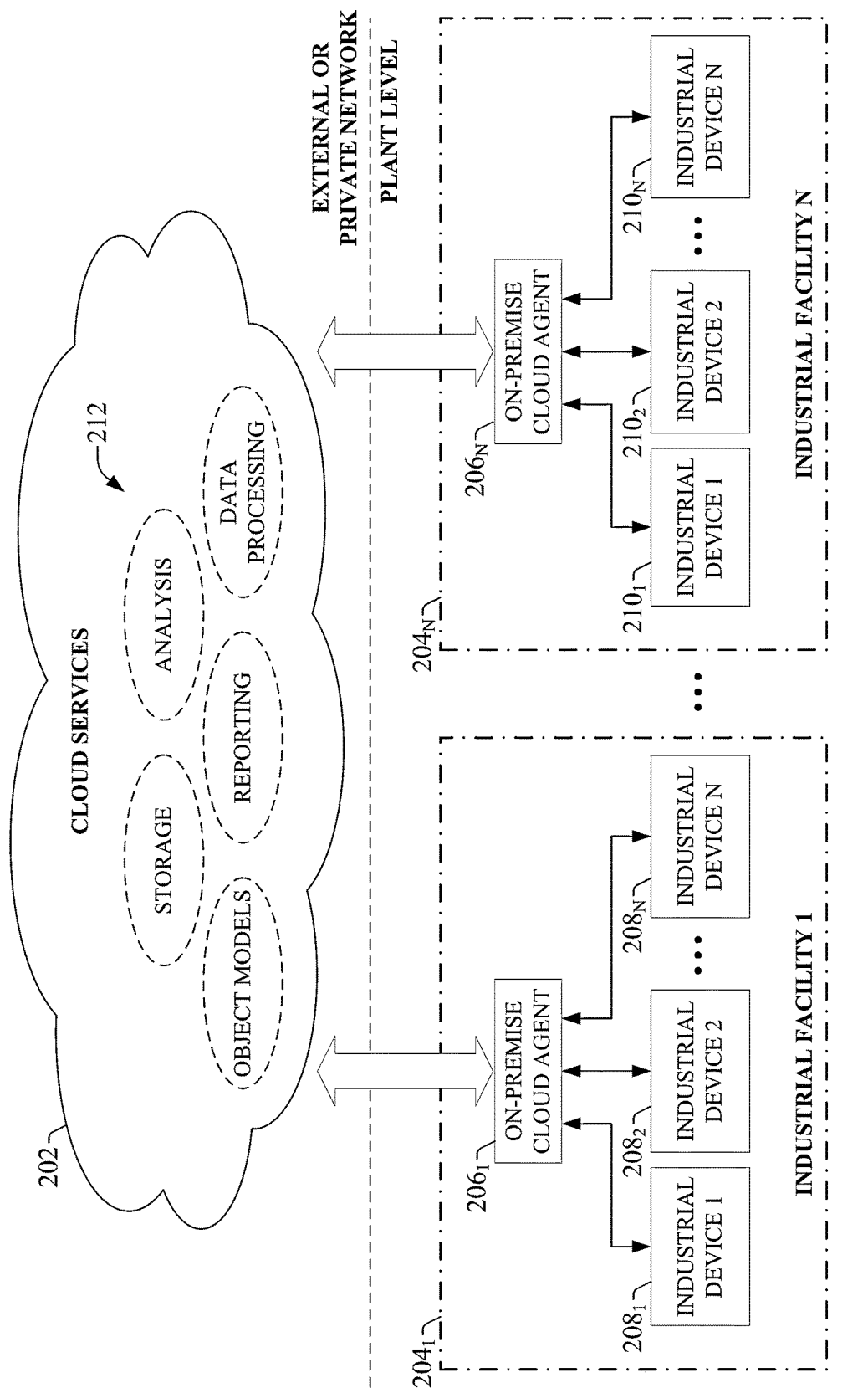
FIG. 2 is a block diagram depicting an example high-level overview of an industrial enterprise that leverages cloud-based services.

Although the exemplary overview illustrated in FIG. 2 depicts the industrial devices 208 and 210 as residing in fixed-location industrial facilities 204, the industrial devices 208 and 210 may also be part of a mobile control application, such as a system contained in a truck or other service vehicle.

According to one or more embodiments, on-premise cloud agents 206 can collect data from industrial devices 208 and 210—or from other data sources, including but not limited to data historians, business-level systems, etc.—and send this data to cloud platform 202 for processing and storage. Cloud platform 202 can be any infrastructure that allows cloud services 212 (such as the cloud-based control loop tuning system described herein) to be accessed and utilized by cloud-capable devices. Cloud platform 202 can be a public cloud accessible via the Internet by devices having Internet connectivity and appropriate authorizations to utilize the services 212. In some scenarios, cloud platform 202 can be provided by a cloud provider as a platform-as-a-service (PaaS), and the services 212 can reside and execute on the cloud platform 202 as a cloud-based service. In some such configurations, access to the cloud platform 202 and the services 212 can be provided to customers as a subscription service by an owner of the services 212. Alternatively, cloud platform 202 can be a private or semi-private cloud operated internally by the enterprise, or a shared or corporate cloud environment. An exemplary private cloud can comprise a set of servers hosting the cloud services 212 and residing on a corporate network protected by a firewall.

Cloud services 212 can include, but are not limited to, data storage, data analysis, control applications (e.g., applications that can generate and deliver control instructions to industrial devices 208 and 210 based on analysis of real-time system data or other factors), visualization applications such as the cloud-based operator interface system described herein, reporting applications, Enterprise Resource Planning (ERP) applications, notification services, or other such applications. Cloud-based data analytics can include embodiments of the controller tuning system described herein. Cloud platform 202 may also include one or more object models to facilitate data ingestion and processing in the cloud. If cloud platform 202 is a web-based cloud, cloud agents 206 at the respective industrial facilities 204 may interact with cloud services 212 directly or via the Internet.

In an exemplary configuration, the industrial devices 208 and 210 connect to the on-premise cloud agents 106 through a physical or wireless local area network or radio link. In another exemplary configuration, the industrial devices 208 and 210 may access the cloud platform 202 directly using integrated cloud agents. Cloud agents and their associated data collection and processing services are discussed in more detail below.

Ingestion of industrial device data in the cloud platform 202 through the use of cloud agents 206 can offer a number of advantages particular to industrial automation. For one, cloud-based storage offered by the cloud platform 202 can be easily scaled to accommodate the large quantities of data generated daily by an industrial enterprise. Moreover, multiple industrial facilities at different geographical locations can migrate their respective automation data to the cloud for aggregation, collation, collective analysis, visualization, and enterprise-level reporting without the need to establish a private network between the facilities. Cloud agents 206 can be configured to automatically detect and communicate with the cloud platform 202 upon installation at any facility, simplifying integration with existing cloud-based data storage, analysis, or reporting applications used by the enterprise. In another example application, cloud-based diagnostic applications can monitor the health of respective automation systems or their associated industrial devices across an entire plant, or across multiple industrial facilities that make up an enterprise. Cloud-based lot control applications can be used to track a unit of product through its stages of production and collect production data for each unit as it passes through each stage (e.g., barcode identifier, production statistics for each stage of production, quality test data, abnormal flags, etc.). Moreover, cloud based control applications can perform remote decision-making for a controlled industrial system based on data collected in the cloud from the industrial system, and issue control commands to the system via the cloud agent. These industrial cloud-computing applications are only intended to be exemplary, and the systems and methods described herein are not limited to these particular applications. The cloud platform 202 can allow software vendors to provide software as a service, removing the burden of software maintenance, upgrading, and backup from their customers.

Figure 3:
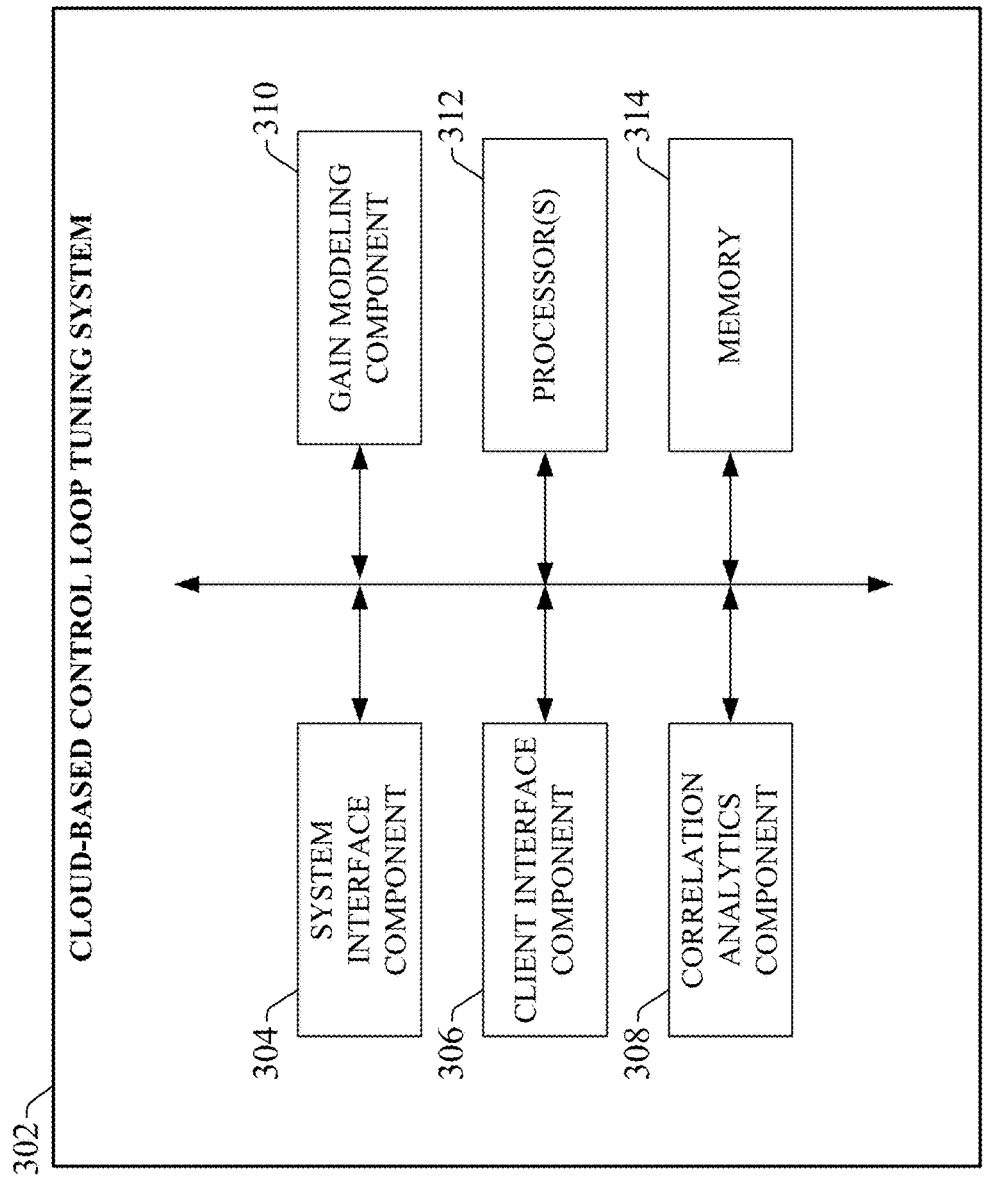
FIG. 3 is a block diagram of an example cloud-based controller tuning system.

FIG. 3 is a block diagram of an example cloud-based control loop tuning system 302 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Cloud-based control loop tuning system 302 can include a system interface component 304, a client interface component 306, a correlation analytics component 308, a gain modeling component 310, one or more processors 312, and memory 314. In various embodiments, one or more of the system interface component 304, client interface component 306, correlation analytics component 308, gain modeling component 310, the one or more processors 312, and memory 314 can be electrically and/or communicatively coupled to one another to perform one or more of the functions of the cloud-based control loop tuning system 302. In some embodiments, components 304, 306, 308, and 310 can comprise software instructions stored on memory 314 and executed by processor(s) 312. Cloud-based control loop tuning system 302 may also interact with other hardware and/or software components not depicted in FIG. 3. For example, processor(s) 312 may interact with one or more external user interface devices, such as a keyboard, a mouse, a display monitor, a touchscreen, or other such interface devices.

System interface component 304 can be configured to receive industrial data from one or more industrial assets comprising an industrial automation system (e.g., a motion or process control system). The industrial data can be received directly from one or more cloud-capable industrial devices having integrated cloud interface capabilities or via a cloud agent device that collects data from one or more industrial assets and injects the collected data to the cloud platform for storage and processing by the system 302. Such cloud agents are described in more detail below.

Client interface component 306 can be configured to exchange data with a client device (e.g., laptop computer, tablet computer, desktop computer, mobile smart device, phone, etc.) to facilitate user interaction with the cloud-based control loop tunings system 302. Data exchanged with the client device via client interface component 306 can include, but is not limited to, a command from the client device to initiate controller gain analysis for a given industrial automation system, recommended controller gain values delivered to the client device by the system 302, user interface screens served to the client device by the system 302, or other such information.

Correlation analytics component 308 can be configured to generate recommended gain values for a closed-loop control system based on analysis of data collected from the controlled system. In some embodiments, correlation analytics component 308 can perform an iterative analysis of a machine or gain correlation model that links controller gain values with process variables to yield suitable controller gains (e.g., PID control loop coefficients) for the control system.

Gain modeling component 310 can be configured to generate the gain correlation model based on process variable data, operational data, configuration data, or other information collected from the industrial system. Gain modeling component 310 can incrementally refine the gain correlation model as new system data is collected to produce a progressively higher fidelity model over time.

The one or more processors 312 can perform one or more of the functions described herein with reference to the systems and/or methods disclosed. Memory 314 can be a computer-readable storage medium storing computer-executable instructions and/or information for performing the functions described herein with reference to the systems and/or methods disclosed.

Figure 4:
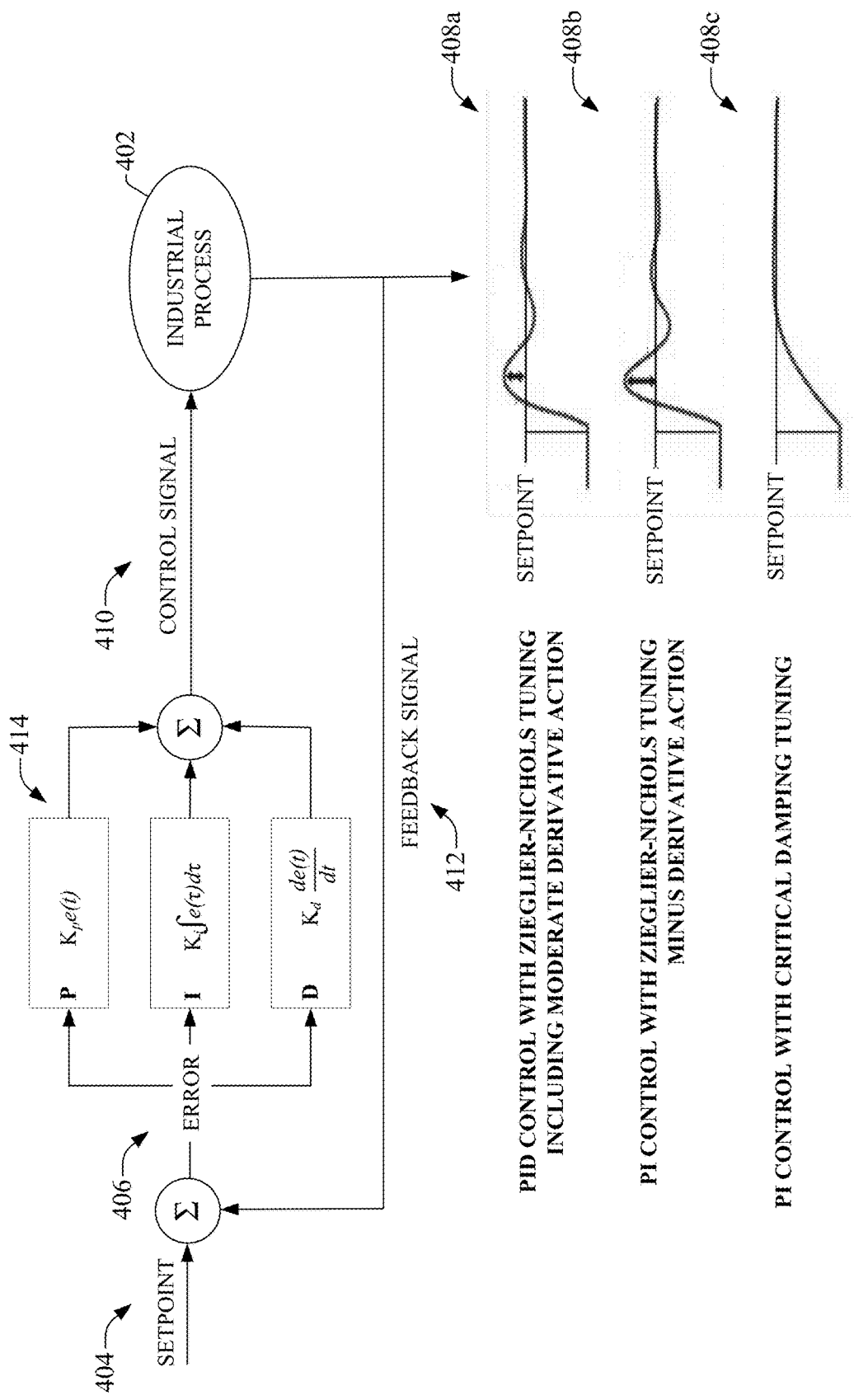
FIG. 4 is a diagram illustrating an example control loop tuning analytic scenario.

FIG. 4 illustrates an example control loop tuning analytic scenario. In this example, an industrial process 402 is controlled using a PID controller, wherein the gains of the PID controller—$K_p$, $K_i$, and $K_d$ (the proportional, integral, and derivative gains, respectively)—determine the response characteristics of one or more process variables of the industrial process 402 to changes in the setpoint 404 or to external disturbances, as well as the robustness and stability of the system. Setpoint 404 represents a target state for the industrial process 402 determined based on the control program executed by the controller. The target state may be, for example, a desired value of a process parameter (e.g., a temperature, a flow, a tank level, etc.), a target velocity or position of a motion device, or other desired state. Feedback signal 412 represents the actual value of the controlled state (e.g., speed, position, process variable, etc.) measured by the controller. The difference between the actual state measured by the feedback signal 412 and the desired state represented by setpoint 404 is calculated as error 406. The controller sends control signal 410 to one or more devices of the industrial process 402 to bring the state of the industrial process 402 in line with the setpoint, where the control signal 410 is a function of the error 406 and the PID controller gains 414.

The values of the PID controller gains 414, together with the properties of the industrial process 402 (e.g., mechanical properties of the mechanical load such as inertia and coupling stiffness, sensitivity of the process variable, etc.) determine the response time of the closed-loop control system, the stability of the system (e.g., degree of oscillation of the system in response to setpoint changes or external disturbances as the controlled parameter attempts to align with the setpoint), the bandwidth and frequency response of the system, and other response characteristics. Response curves 408 illustrate three example system responses based on respective different tuning methods. Response curve 408a illustrates an example system response when the controller is tuned using Zieglier-Nichols tuning with moderate derivative action (represented by the D controller gain), while response curve 408b illustrates the system response minus derivative action. The first tuning results in a smaller initial overshoot of the process variable compared with the second tuning, and thus yields smaller oscillation amplitudes relative to the second tuning. Response curve 408c illustrates the system response when a critical damping tuning is used. As can be seen in response curve 408c, the process variable responds more slowly to the setpoint change, but experiences little or no overshoot or system oscillation compared with the first two tunings. Response curve 408c illustrates a more stable tuning at the expense of response time.

The cloud-based architecture described herein supports creation of a generic PID controller tuning system in the cloud platform 202, thereby leveraging cloud-based analytics and big data analysis to facilitate accurate tuning of the PID controller gains 414 for optimum control response time and system stability. To this end, a virtual link is established between the PID controller gains and the process variables based on a gain correlation model maintained in the cloud platform.

Figure 5:
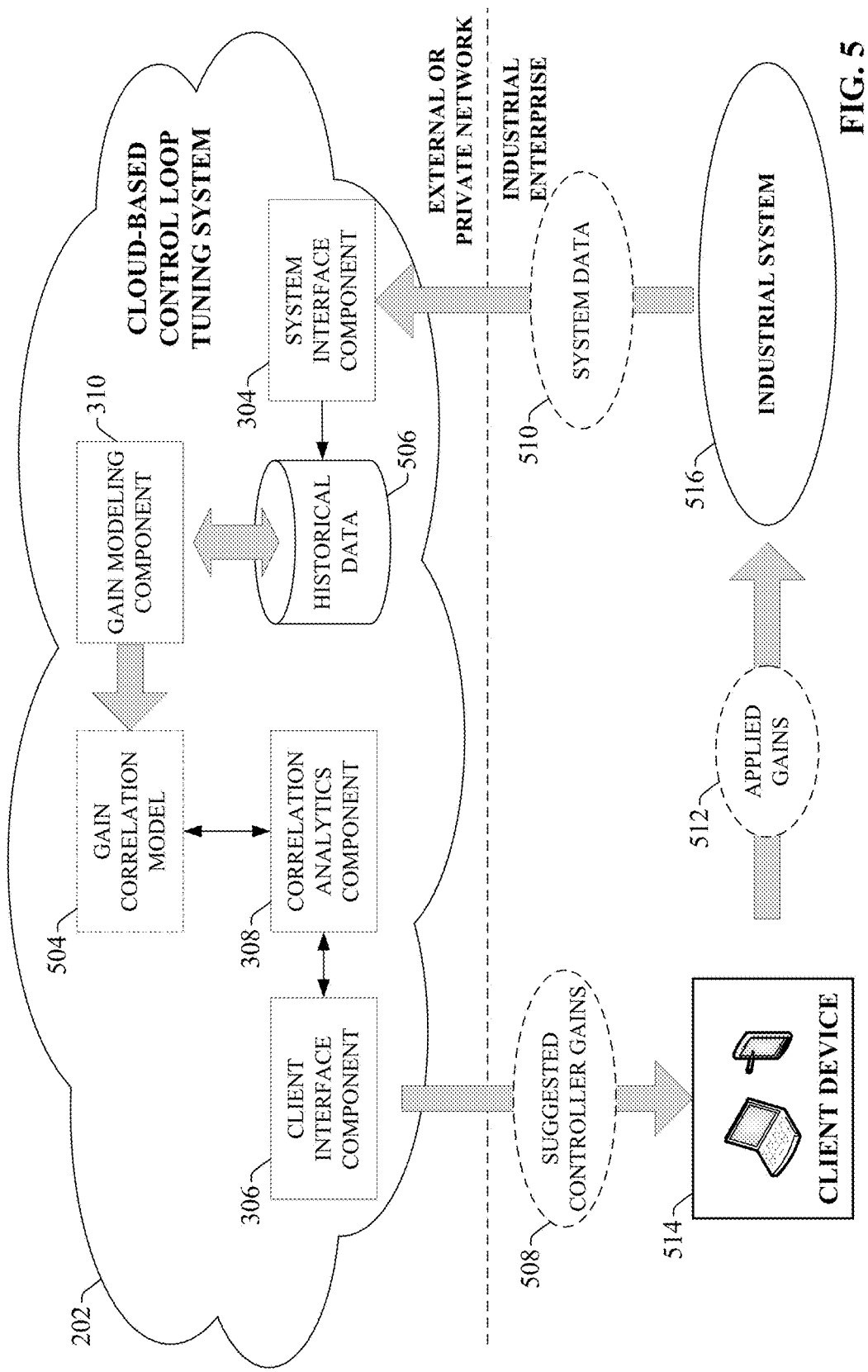
FIG. 5 is a block diagram illustrating an example cloud-based control loop tuning system.

FIG. 5 is a block diagram illustrating an example cloud-based control loop tuning system. As described above, the components of the control loop tuning system can be collectively implemented in a cloud platform 202 as a service accessible to authorized users (e.g., subscribers to the cloud-based control loop tuning system). Industrial system 516 is deployed at a plant facility, and comprises a motion system or industrial process system under the control of a closed-loop control system (e.g., a PID control loop). System data 510 is collected from the industrial system 516 and sent to the cloud platform 202 via system interface component 304, which maintains a communication channel between the cloud platform 202 and one or more industrial devices or cloud agent devices on the plant floor. In some embodiments, the system data 510 is provided to the system interface component 304 directly by one or more cloud-capable industrial devices comprising the industrial system 516 (e.g., industrial controllers, motor drives, human-machine interfaces, sensors, telemetry devices, etc.). In such embodiments, the one or more industrial devices may include an integrated cloud interface component configured to couple the cloud-aware smart device to the system interface component 304 and exchange data with the cloud platform 202. Alternatively, system data 510 can be provided to the cloud platform 202 by one or more cloud agent devices that collect data from the industrial devices and push the data to the cloud platform, as will be described in more detail below.

The system data 510 can comprise such information as process variable values for a controlled process (e.g., temperatures, pressures, flows, levels, etc.), motion device position and/or velocity data, device configuration information (e.g., variable frequency drive configuration parameters, analog output scale factors configured for an industrial controller, etc.), device or system level faults and alarms, machine cycle time information, calculated key performance indicators (KPIs), measured indicators of system performance over time, device or system documentation, device firmware revisions, or other such information relating to configuration and operating characteristics of the industrial system 516. The system data 510 is moved to historical data storage 506, which comprises cloud storage allocated to the industrial enterprise that owns industrial system 516 for storage and analysis of their system data.

As noted above, the cloud-based control loop tuning system generates suitable controller gains for a given motion or process control application by leveraging a gain correlation model 504 built for the customer's unique industrial system 516. The gain correlation model 504 defines relationships between controller gains (e.g., PID gains) and process variables for an end user's unique industrial system, allowing correlation analytics component to determine suitable controller gains for a given industrial system. Gain modeling component 310 builds gain correlation model 504 based on big data analysis of the historical system data maintained in historical data storage 506. The big data analysis can discover correlations between controller gain values and process variable response of the industrial system, which are then encoded in gain correlation model 504. Correlation analytics component 308 analyzes the gain correlation model 504 to determine suitable controller gains determined to yield acceptable response time and robust system stability.

The suggested tuned controller gains 508 are delivered by the client interface component 306 to a client device 514 associated with an authorized plant employee (e.g., a system designer). The user of client device 514 may then choose to apply the recommended controller gains to the controller of industrial system 516. For example, the client device 514 may interact with client interface component 306 (and thereby with the cloud platform 202) using a cloud interface application executing on the client device. Client interface component 306 may deliver the suggested controller gains 508 to the cloud interface application, or to a controller program development environment executing on the client device 514 (which may include an integrated cloud interface to allow the controller development software to interact with both the cloud platform 202 and an industrial controller). The applied gains 512 can then be downloaded to the controller using the controller development software.

Figure 6:
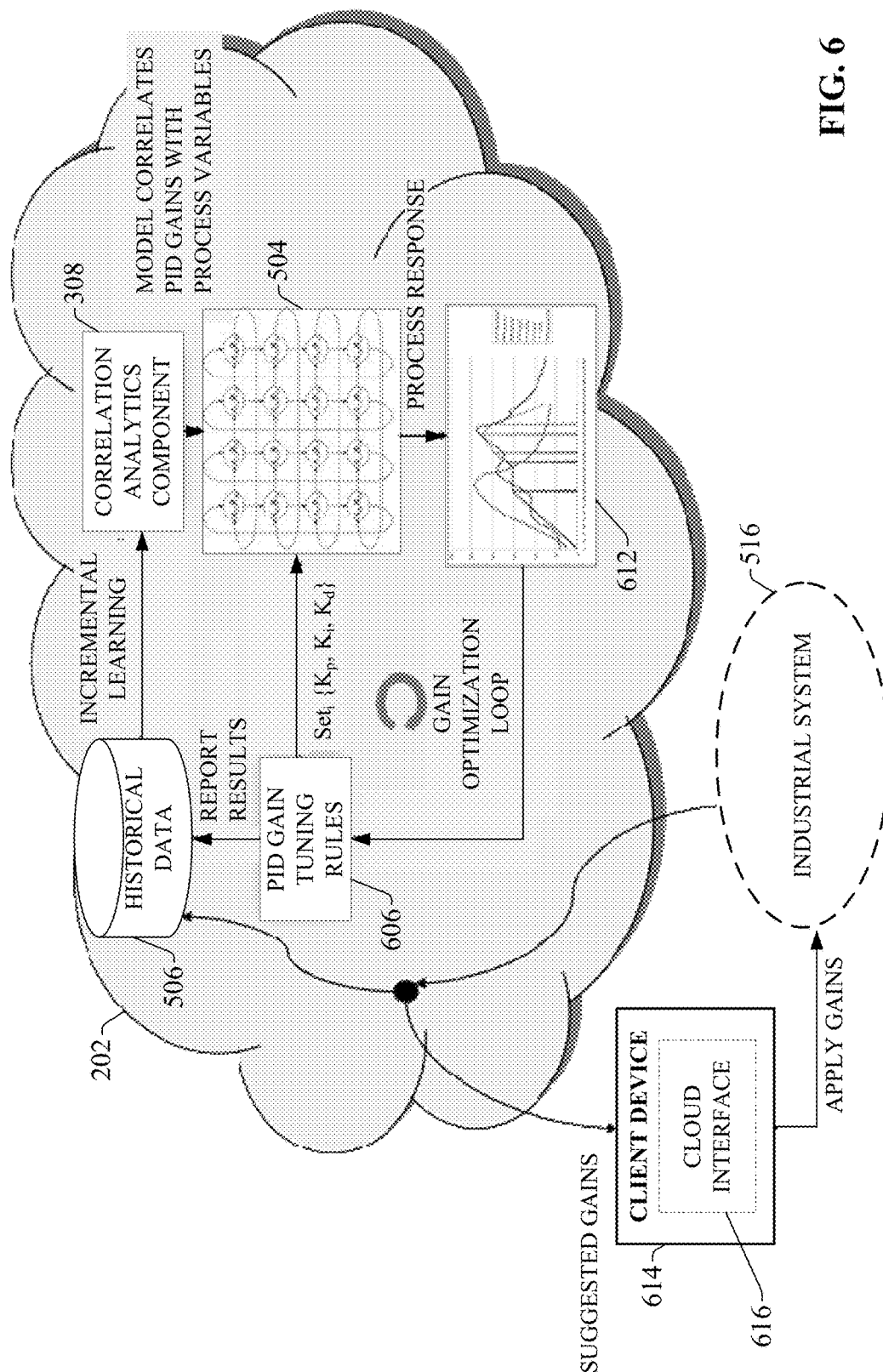
FIG. 6 is a block diagram illustrating iterative analysis performed by one or more embodiments of the control loop tuning system.

In one or more embodiments, the cloud-based control loop tuning system can employ an iterative analytical procedure to build gain correlation model 504 and/or determine substantially optimized controller gains for a given control application. FIG. 6 is a block diagram illustrating the iterative analysis performed by one or more embodiments of the control loop tuning system described herein. In this example, process variables and other operational data generated by the industrial system 516 (e.g., an industrial machine, motion system, or process) are monitored and collected in the cloud platform 202 and stored in cloud-based historical data storage 506. The system uses an incremental learning system, whereby a correlation analytics component 308 leverages gain correlation model 504 to correlate controller gain values (e.g., PID gain coefficients) with process variables of the industrial system 516. In some embodiments, gain modeling component 310 generates gain correlation model 504 based on historical data collected from the devices of industrial system 516, and may iteratively update the gain correlation model 504 over time as new data is gathered from the industrial system 516 and correlated in the cloud platform 202.

The present example assumes that industrial system 516 uses a PID control loop to control a machine or process. For an initial iteration i, initial controller gain values for $K_p$, $K_i$, and $K_d$ are set, and the correlation analytics component 308 generates simulated process response results 612 that estimate the response of the machine or process to the initial gain values (e.g., the response of the controlled process variable, motion device speed, motion device position, etc.). For a subsequent iteration, the system adjusts one or more of the process gains based on the response results 612 and PID gain tuning rules 606 defined for the control loop tuning system. PID gain tuning rules 606 may comprise rules that dictate how each of the PID gains should be adjusted in response to particular features of the process response curves (e.g., characteristics of the simulated frequency response curves, response times, setpoint overshoots, degree of system oscillation, calculated system bandwidth, etc.). The modified gains are provided to the gain correlation model 504 for another simulation, and the process response results 612 are again used to modify one or more of the PID gains. The results of each iteration can also be provided to historical data storage 506 and stores in association with the test gains used to generate each result. These historical test results can be leveraged by correlation analytics component 308 to refine process response results for a given iteration.

This iterative process of generating a simulated process response and iteratively modifying the PID gains based on the results comprises a gain optimization loop that gradually converges to a set of suggested PID gain values determined to yield optimal control of the industrial system 516. Once the iterative process has completed (based on a defined completion condition), the suggested gains are provided to client device 514 via a cloud interface 616, which serves as a user interface for the cloud-based tuning process. If cloud interface 616 also serves as an interface to the industrial controller, interface 616 can also generate user prompts offering the user the option of applying the suggested control loop configuration to the actual controller of the industrial system 516. In another scenario, cloud interface 616 may allow the suggested gains to be exported to a separate controller programming interface for download to the controller.

The control loop tuning system may also save a record of the suggested gain values together with a record of the simulated response data on cloud storage in association with a customer identifier associated with the owner of industrial system 516, thereby providing a backup of the controller gain settings that can be retrieved at a future time if the controller must be re-configured due to loss of programming, or if a replacement controller requires configuration.

In scenarios in which a user of client device 614 is actively initiating the control loop tuning sequence and requesting suggested gain values from the cloud-based control loop tuning system, the client interface component 306 will deliver the suggested gains to the client device 614 upon completion of the iterative gain optimization process (e.g., when the process response satisfies a defined completion criterion). Since the gain modeling component 310 can update the gain correlation model 504 incrementally on the cloud platform as new system data is collected from the industrial system 516, the system may subsequently determine—based on the updated model—that adjustment of the previously determined controller gains is likely to yield improved system performance. Accordingly, in some embodiments, the cloud-based control loop tuning system may be configured to automatically re-execute the gain optimization sequence depicted in FIG. 6, either periodically or in response to defined conditions (e.g., a determination that the gain correlation model 504 has evolved by a defined degree relative to the model that yielded the current controller gains). In such embodiments, the client interface component 306 may deliver a notification to one or more client devices if the correlation analytics component 308 determines that new controller gains determined based on an automatic re-execution of the loop tuning sequence are likely to yield an improved system performance relative to the current gains (e.g., by comparing the new simulated process response with the previously saved simulated response generated using the current controller gain values). The client interface component 306 may deliver the recommended gains to the client device 514 together with the notification, or may deliver only the notification to the client device 514, providing a link to a network location at which the new recommended controller gains can be viewed and/or retrieved. The notification may also include an identification of the particular industrial system to which the new recommended gains are applicable, instructions regarding how to implement the new gains on the industrial controller, etc.

The client interface component 306 may leverage a customer model (not shown) stored on the cloud platform in association with the customer identifier to determine how notifications regarding recommended controller gains should be delivered. Example information maintained in the customer model can include a client identifier, client contact information specifying which plant personnel should be notified in the event that new controller gains are to be recommended, notification preferences specifying how plant personnel should be notified (e.g., email, mobile phone, text message, etc.), preferred technical support personnel to be contacted for support in connection with implementing the controller gains on the customer's particular industrial controller, service contracts that are active between the customer and the technical support entity, and other such information.

Figure 7:
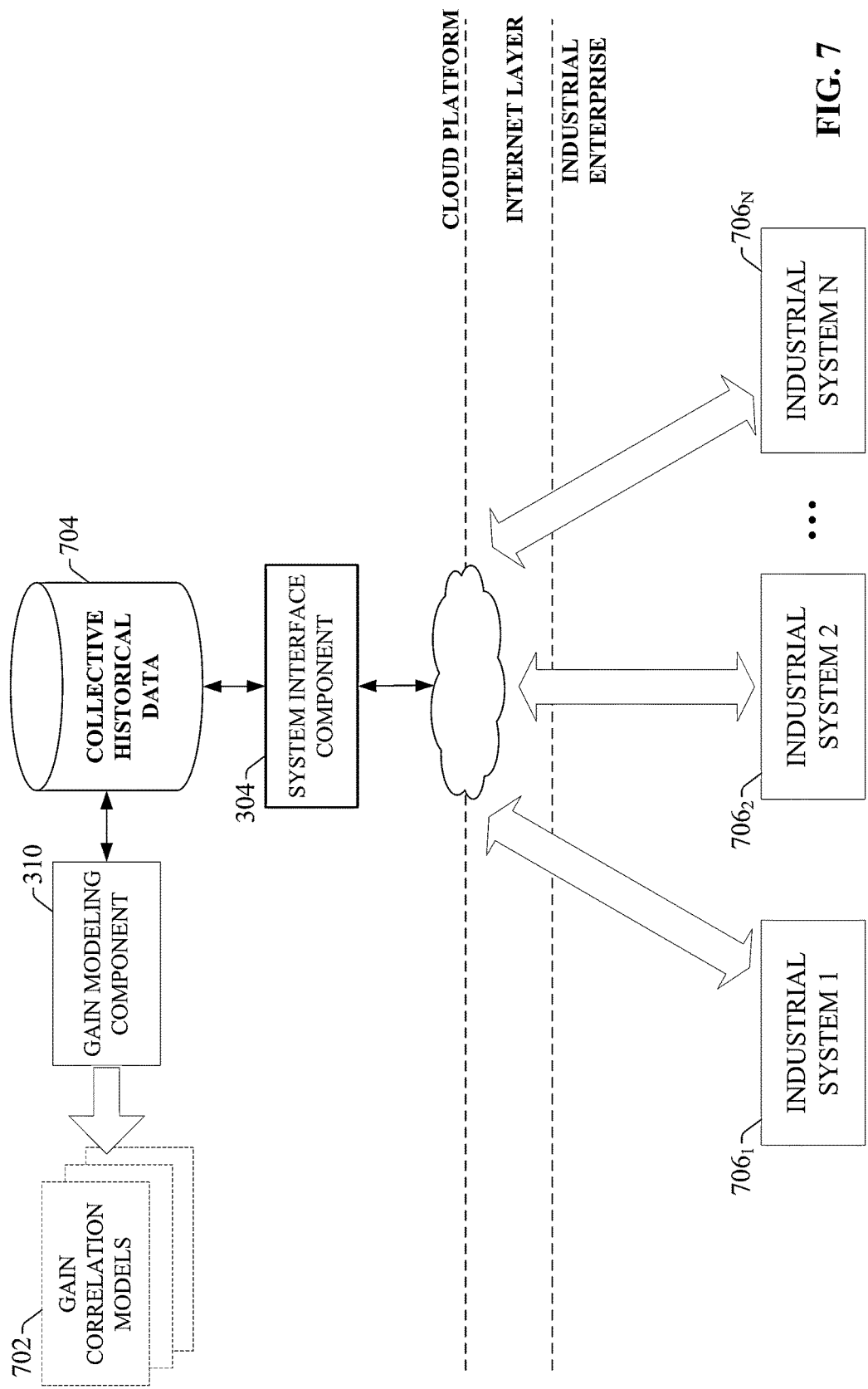
FIG. 7 is a conceptual diagram illustrating collection of data from devices and assets comprising respective different industrial systems for storage in cloud-based collective historical data storage for creation of gain correlation models.

Providing the control loop tuning system on a cloud platform allows the gain tuning services to be accessed globally by multiple industrial enterprises or customers from any location. In addition to maintaining individual customer-specific historical data stores for each industrial enterprise, some embodiments of the cloud-based control loop tuning system can also feed sets of customer data to a collective historical data storage for collective big data analysis in the cloud. As illustrated in FIG. 7, system interface component 304 of the control loop tuning system can collect data from devices and assets comprising respective different industrial systems 706 for storage in cloud-based collective historical data storage 704. In some embodiments, data maintained in collective historical data storage 704 can be collected anonymously with the consent of the respective customers. For example, customers may enter into a service agreement with a technical support entity whereby the customer agrees to have their industrial device and asset data collected by the cloud-based control loop tuning system in exchange for controller gain tuning services. Collective historical data storage 704 can organize the collected data according to device type, system type, application type, applicable industry, or other relevant categories.

Gain modeling component 310 can analyze the resulting multi-industry, multi-customer data to learn industry-specific, device-specific, machine-specific, and/or application-specific trends, behavior patterns, thresholds, or other information that can be used to characterize relationships between process variable response and controller gain values across different types of systems, equipment, and devices. In such embodiments, gain modeling component 310 can perform big data analysis on the multi-enterprise data maintained in collective historical data storage to learn and characterize operational trends or patterns as a function of industry type, application type, equipment in use, industrial asset configuration, device configuration settings, or other such variables. The gain modeling component 310 can then use results of this analysis to build application-specific gain correlation models 702 based on an assessment of a particular customer's control system.

For example, it may be known that a particular industrial asset in use at a given customer facility (e.g., a machine, a unit of equipment, a controller, a drive, etc.) is used across different industries for different types of industrial applications. Accordingly, gain modeling component 310 can identify a subset of the global data stored in collective historical data storage 704 relating to the asset or asset type, and perform analysis on this subset of data to determine how the asset or asset type performs over time for different control loop tunings. For example, the gain modeling component 310 may monitor a common process variable of similar systems at different customer sites, and record the controller gains used for the respective control loops. By collectively analyzing this multi-enterprise data, the gain modeling component can refine the gain correlation models 702 to more accurately link process parameters with control loop gains. By leveraging a large amount of historical data gathered from many different industrial systems, gain modeling component 310 can learn common operating characteristics of many diverse configurations of industrial assets using different controller gain tunings at a high degree of granularity and under many different operating contexts.

In some embodiments, gain modeling component 310 can compare operational behavior of similar industrial applications across different device hardware platforms or software configuration settings, and make a determination regarding which combination of hardware, configuration settings, and/or controller gains yield preferred operational performance. Moreover, gain modeling component 310 can compare data across different verticals to determine whether system configurations used at one vertical could beneficially be packaged and implemented for another vertical. Some embodiments of the control loop tuning system can use such determinations as the basis for customer-specific recommendations. In general, collective historical data storage 704, together with gain modeling component 310, can serve as a repository for knowledge capture and best practices for a wide range of industries, industrial applications, and device combinations.

It is to be appreciated that any suitable technique can be used to migrate data from the device-level industrial systems on the plant floor to historical data storage 506. In this regard, the gain correlation modeling and loop tuning analytics performed by the gain modeling component 310 and the correlation analytics component 308 are agnostic with regard to the specific technology used to ingest plant floor data in the cloud platform. Thus, the analysis of the collected industrial data maintained in historical data storage 506 is decoupled from the particular technologies used to move the industrial data from the plant floor to the cloud platform.

Figure 8:
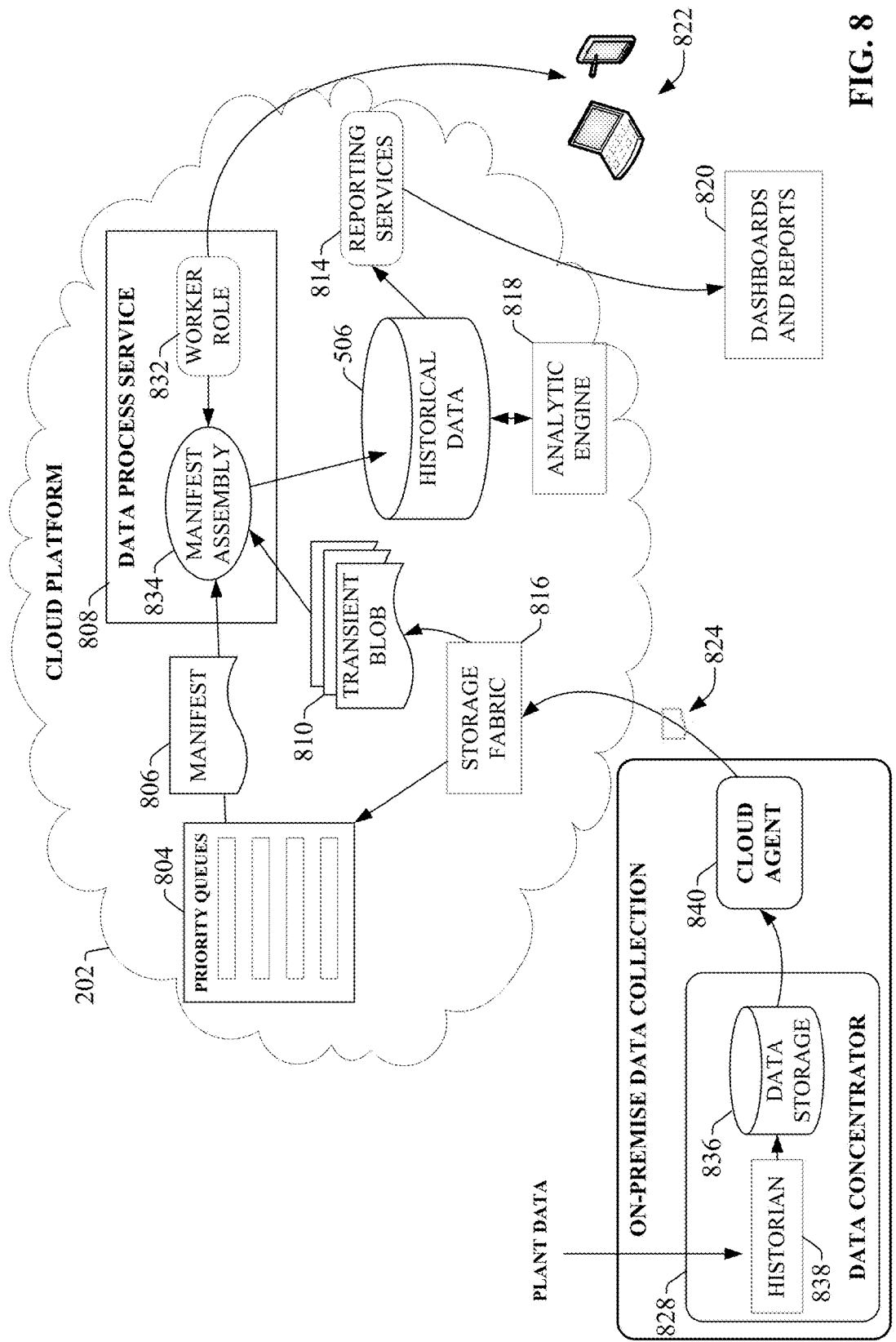
FIG. 8 is a diagram illustrating a system that leverages an agent-based cloud infrastructure to provide data collection and processing services.

In a non-limiting example, data from a customer's industrial devices and systems can be provided to the cloud platform for storage and analysis using cloud agent devices in some embodiments. FIG. 8 is an overview of a system that leverages an agent-based cloud infrastructure to provide data collection and processing services (such as the control loop tuning services described herein) to customer manufacturing sites. This system can provide remote collection and analysis services in connection with remote controller gain tuning.

In the example illustrated in FIG. 8 a data concentrator 828 collects plant data from one or more industrial assets (e.g., data generated by one or more industrial controllers, such as industrial devices 208 or 210) at a plant facility. These industrial assets can include industrial controllers that monitor and control industrial I/O devices, data servers and historians, motor drives, remote I/O interfaces that remotely interface groups of I/O devices to one or more of the industrial controllers, boilers or other industrial machines, or other such assets. For example, data concentrator 828 can monitor one or more controller tags defined in a tag archive and store data in local data storage 836 (e.g., a local structured query language, or SQL, server) associated with a historian 838. The collected data can include historical data (e.g., alarm history, status history, trend data, etc.), live data values read from the industrial assets, alarm data generated by the industrial assets, or other types of data.

An on-premise cloud agent 840 is configured to collect the live or historical data from the industrial assets, either directly or by accessing data storage 836 associated with data concentrator 828. Cloud agent 840 can execute on any suitable hardware platform (e.g., a server, a LINUX box, etc.), and acts as a generic gateway that collects data items from the various industrial assets on the plant network and packages the collected data according to a generic, uniform data packaging schema used to move the on-premise data to a cloud platform 202. Cloud agent 840 provides a software mechanism to dynamically link on-premise-to-cloud gateways. Cloud agent 840 provides an expandable data type schema that allows new data types to be added without the need to redeploy the monitoring system to the cloud.

During data collection, the cloud agent 840 can intelligently sort and organize the data based on defined criteria, including but not limited to time of occurrence and/or user-defined priorities. Cloud agent 840 can be, for example, a service (e.g., a Windows service) that periodically collects and transmits serialized and compressed data into the cloud domain using standard web services over HTTPS/SSL.

FIG. 8 depicts data concentrator 828 as the data source for cloud agent 840. This configuration can be useful if there are a large number of data points to monitor, since the data concentrator can 828 can link multiple industrial devices or other data sources to a single cloud agent 840. However, some embodiments of cloud agent 840 can collect data directly from the industrial assets themselves; e.g., through a common industrial protocol link, or through middleware applications such as OPC clients.

Figure 9:
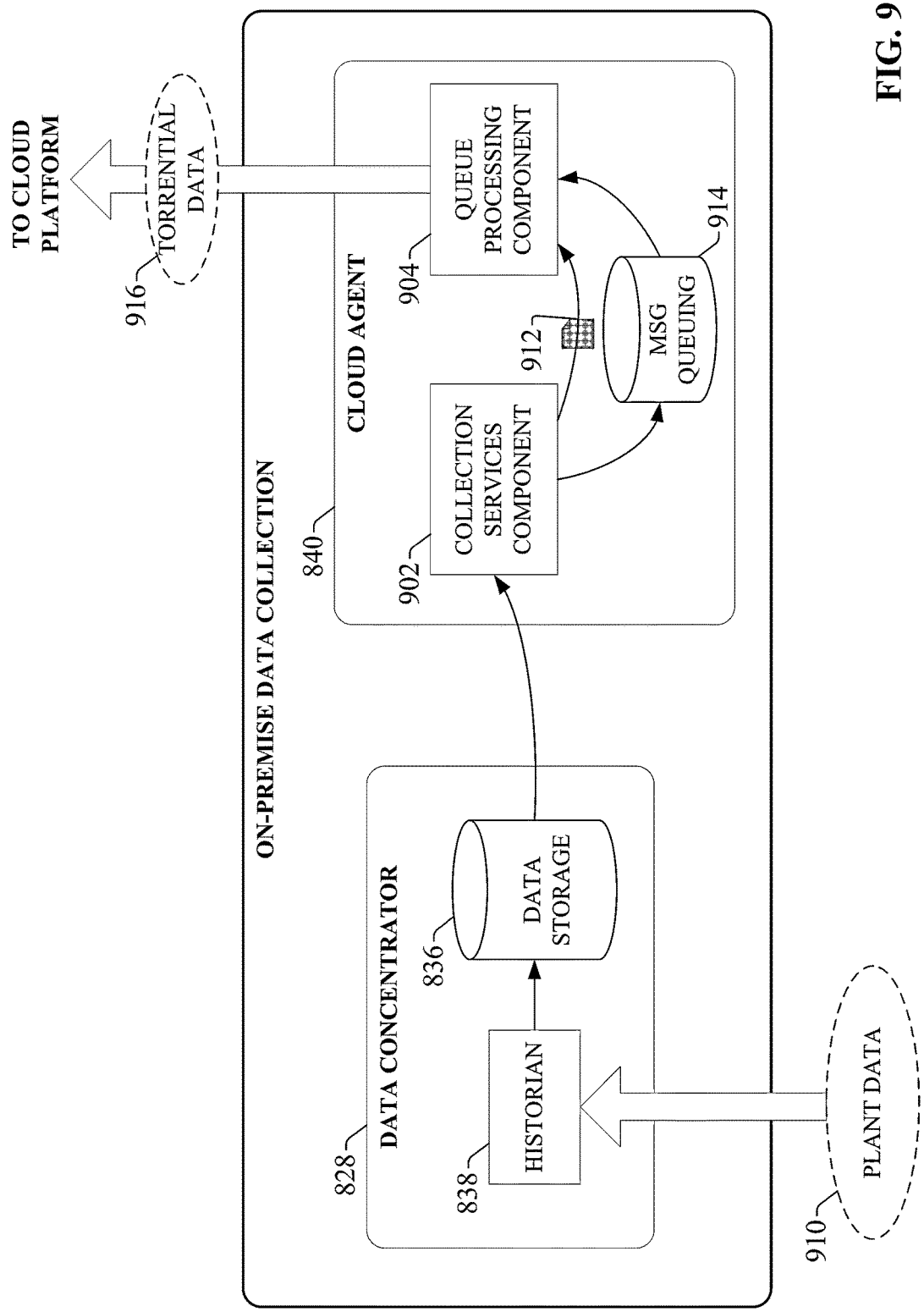
FIG. 9 is a block diagram illustrating on-premise data collection.

Cloud agent functionality is illustrated in more detail with reference to FIG. 9. On-premise data collection is enabled by a collection of services that function as a virtual support engineer for processing data. Data concentrator 828 and cloud agent 840 respectively implement two main functions associated with data collection —data concentration using a historian 838 and associated data storage 836 (e.g., an SQL server), and cloud data enablement using cloud agent services executed by cloud agent 840. As noted above, plant data 910 is collected by data concentrator 828 at the plant facility. In an example scenario, plant data 910 may comprise time series sensor data made up of thousands of data points updated at a rate of less than a second.

Collection services component 902 of cloud agent 340 implements collection services that collect device data, either from data concentrator's associated data storage (e.g., via an SQL query) or directly from the devices themselves via a common industrial protocol (CIP) link or other suitable communication protocol. For example, to obtain data from data concentrator 828, collection services component 902 may periodically run a data extraction query (e.g., an SQL query) to extract data from data storage 836 associated with data concentrator 828. Collection services component 902 can then compress the data and store the data in a compressed data file 912. Queue processing services executed by queue processing component 904 can then read the compressed data file 912 and reference a message queuing database 914, which maintains and manage customer-specific data collection configuration information, as well as information relating to the customer's subscription to the cloud platform and associated cloud services. Based on configuration information in the message queuing database 914, queue processing component 904 packages the compressed data file 912 into a data packet and pushes the data packet to the cloud platform. In some embodiments, the cloud agent 840 can support injecting data packets as torrential data 916.

Message queuing database 914 can include site-specific information identifying the data items to be collected (e.g., data tag identifiers), user-defined processing priorities for the data tags, firewall settings that allow cloud agent 840 to communicate with the cloud platform through a plant firewall, and other such configuration information. Configuration information in message queuing database 914 instructs cloud agent 840 how to communicate with the identified data tags and with the remote data collection services on the cloud platform.

In addition to collection and migration of data, one or more embodiments of cloud agent 840 can also perform local analytics on the data prior to moving the data to the cloud platform. This can comprise substantially any type of pre-processing or data refinement that may facilitate efficient transfer of the data to the cloud, prepare the data for enhanced analysis in the cloud, reduce the amount of cloud storage required to store the data, or other such benefits. For example, cloud agent 840 may be configured to compress the collected data using any suitable data compression algorithm prior to migrating the data to the cloud platform. This can include detection and deletion of redundant data bits, truncation of precision bits, or other suitable compression operations. In another example, cloud agent 840 may be configured to aggregate data by combining related data from multiple sources. For example, data from multiple sensors measuring related aspects of an automation system can be identified and aggregated into a single cloud upload packet by cloud agent 840. Cloud agent 840 may also encrypt sensitive data prior to upload to the cloud. In yet another example, cloud agent 840 may filter the data according to any specified filtering criterion (e.g., filtering criteria defined in a filtering profile stored on the cloud agent). For example, defined filtering criteria may specify that pressure values exceeding a defined setpoint are to be filtered out prior to uploading the pressure values to the cloud.

In some embodiments, cloud agent 840 may also transform a specified subset of the industrial data from a first format to a second format in accordance with a requirement of a cloud-based analysis application. For example, a cloud-based reporting application may require measured values in ASCII format. Accordingly, cloud agent 840 can convert a selected subset of the gathered data from floating point format to ASCII prior to pushing the data to the cloud platform for storage and processing. Converting the raw data at the industrial device before uploading to the cloud, rather than requiring this transformation to be performed on the cloud, can reduce the amount of processing load on the cloud side.

Cloud agent 840 may also associate metadata with selected subsets of the data prior to migration to the cloud, thereby contextualizing the data within the industrial environment. For example, cloud agent 840 can tag selected subsets of the data with a time indicator specifying a time at which the data was generated, a quality indicator, a production area indicator specifying a production area within the industrial enterprise from which the data was collected, a machine or process state indicator specifying a state of a machine or process at the time the data was generated, a personnel identifier specifying an employee on duty at the time the data was generated, or other such contextual metadata. In this way, cloud agent 840 can perform layered processing of the collected data to generate meta-level knowledge that can subsequently be leveraged by cloud-based analysis tools to facilitate enhanced analysis of the data in view of a larger plant context.

To ensure secure outbound traffic to the cloud, one or more embodiments of cloud agent 840 can support HTTPS/SSL, certificate authority enabled transmission, and/or unique identity using MAC addresses. Cloud agent 840 can also support store-and-forward capability to ensure data is not lost if the agent becomes disconnected from the cloud.

Returning now to FIG. 8, cloud agent 840 sends compressed data packet 824 to the cloud-based data collection and monitoring system on cloud platform 802 via a cloud storage fabric 816. The data packet 824 conveys parameters and data (compressed and serialized) used by the cloud-side services to reconstruct the domain data structure in the cloud using auxiliary tenant-level manifests. The cloud services direct remote storage of the received data into preconditioned transient blobs 810. The cloud platform 202 can use agent reasoning and collective bargain features to determine a data storage locale.

Through the configuration interface provided by cloud agent 840, users at the plant facility can dynamically configure one or more priority queues 804 that respectively define how the data packets are processed in the cloud platform 202. For example, separate queues may be defined for alarms, live data, and historical data, allowing data to be organized according to these data types. The historical data queue can relate to time-series records, which can be accessed through an application programming interface (API) (e.g., an SQL API or other suitable API). The alarms queue can relate to abnormal situations, where the alarm data can also be accessed through the API. This alarms queue can comprise multiple queues associated with different alarm priorities, to allow for individual processing for different alarms having different levels of criticality. In some embodiments, servers, controllers, switches, etc., can be monitored using a number of protocols, and at a certain point (e.g., at the end of a monitoring cycle) alarms can be queued and cloud agent 840 can send the alarms to the cloud. Alarms can be reactive (e.g., alarms that trigger when a motor fails, when a CPU crashes, when an interlock is tripped, etc.) or proactive (e.g., a monitoring system may track consumables on a machine and generate an alarm when time to reorder, monitor cycle counts on a machine and generate an alarm when to schedule preventative maintenance, generate an alarm when temperatures fall outside defined bandwidths, send a notification when a computer's memory is 80% full, etc.).

The live data queue can relate to substantially real-time monitored data, such as current temperatures, current pressures, etc. The live data values can also be accessed through the API (e.g., a SQL API). The queues described above are not intended to be limiting, and it is to be appreciated that other types of priority queues can be defined according to the needs of the end user. For example, queues may be defined for specific devices or device types (e.g., motor drives) for uploading of device parameter and/or performance data.

In some embodiments, cloud agent 840 can allow the user to define these priority queues 804 from the on-site location and to define how data in each queue is handled. For example, the user can define, for each queue, an upload frequency, a priority level (e.g., which data queues should take processing priority over other data queues), identities of cloud partitions or databases in which data from the respective queues should be stored, and other such information. In an example scenario, the live data queue may be defined to process live data values that are to be used by a remote operator interface application to view substantially real-time data from the plant facility, while historical data queue may be used to process historian data for archival storage in a historical database on cloud storage (e.g., historical data storage 506). Accordingly, the live data queue may be assigned a higher priority relative to the historical data queue, since data in the live data queue is more time-critical than data in the historical queue.

Through cloud agent 840, users can assign priorities to respective data tags or tag groups at the customer site. These priority assignments can be stored in the message queuing database 914 of the cloud agent 840. Accordingly, when queue processing component 904 packages the collected data to be moved to the cloud platform, the collected data items can be packaged into data packets according to priority (as defined in message queuing database 914), and the respective data packet headers populated with the appropriate priority level. If access to the cloud is unavailable, data will continue to be collected by collection services component 902 and stored locally on the cloud agent in local storage associated with collections services. When communication to the cloud is restored, the stored data will be forwarded to cloud storage. Queue processing services can also encrypt and send storage account keys to the cloud platform for user verification.

Figure 10:
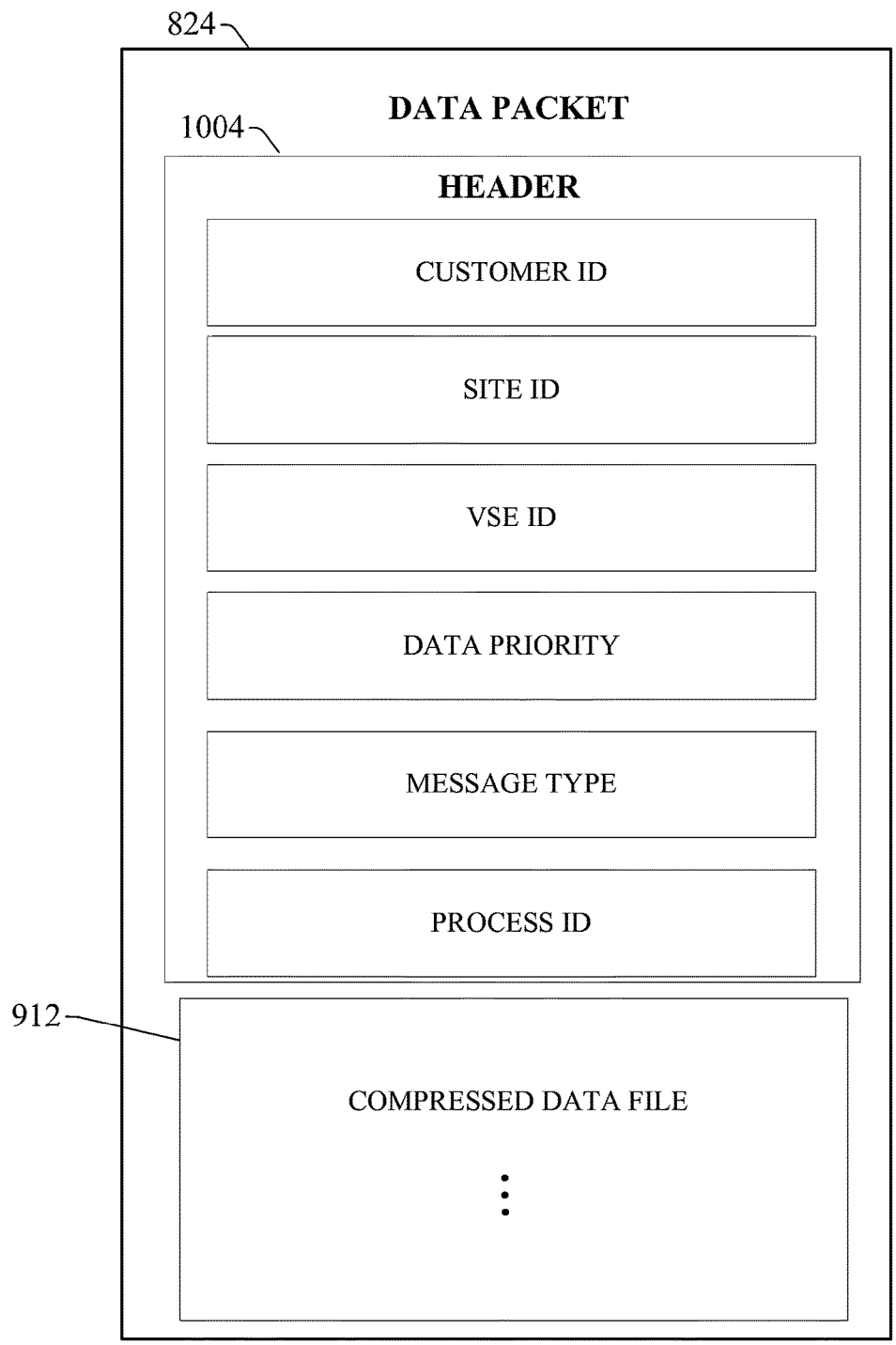
FIG. 10 is a diagram of an example compressed data packet.

Message queuing services implemented by queue processing component 904 of cloud agent 840 encapsulates or packages the compressed data file by adding customer-specific header information to yield a compressed data packed (e.g., compressed data packet 824 of FIG. 8). For example, the queue processing component 904 can access a message queuing database (e.g., message queuing database 914 of FIG. 9), which stores customer site configuration information and manages the customer's subscription to the cloud platform services. The message queuing database may include such information as a customer identifier associated with the customer entity associated with the industrial enterprise, a site identifier associated with a particular plant facility from which the data was collected, a priority to be assigned to the data (which may be dependent on the type of information being sent; e.g., alarm data, historical data, live operational data, etc.), information required to facilitate connection to the customer's particular cloud fabric, or other such information. The information included in the header is based on this customer-specific information maintained in the message queuing database. An example compressed data packet is illustrated in FIG. 10. As shown, the cloud agent's message queuing services add a header 1004 to compressed data file 912 to yield the compressed data packet 824. The header 1004 contains customer-specific data read from message queuing database 914. For example, header 1004 can include a unique customer identifier, a site identifier representing a particular plant facility, a virtual support engineer identifier, a data priority for the data in the compressed data file 912, a message type, and a process identifier that specifies a particular manifest application on the cloud platform that should be used to process the data on the cloud side. Packaging the data in this way can allow data from diverse data sources to be packaged together using a uniform, generic data packaging schema so that the data can be moved to the cloud infrastructure When cloud agent 840 sends a data packet to the cloud-based remote processing service, the service reads the packet's header information to determine a priority assigned to the data (e.g., as defined in a data priority field of the data packet) and sends the data packet (or the compressed data therein) to a selected one of the user defined priority queues 804 based on the priority. On the other side of the priority queues 804, a data process service 808 processes data in the respective priority queues 804 according to the predefined processing definitions. The data processing service includes a worker role 832 that determines how the queued data is to be processed based on manifests (e.g., system manifests, tag manifests, and metric manifests) stored in a customer-specific manifest assembly 834. Manifests define and implement customer-specific capabilities, applications, and preferences for processing collected data in the cloud. Manifests can be dynamically uploaded by a user at the plant facility through cloud agent 840, which facilitates dynamic extension of cloud computing capability.

For example, if new data points are to be added to the data collection system that require creation of a new data queue, the user can interact with cloud agent 840 to configure a new manifest for the new queue, the manifest defining such aspects as processing priority for the data, upload frequency for the data, where the data is to be routed or stored within cloud storage, and other such information. Cloud agent 840 can then upload the new manifest 806 together with the data (or independently of the data). The new manifest 806 is then added to the customer's manifest assembly 834 with the other manifests defined for the customer, so that worker role 832 can leverage the new manifest 806 to determine how data in the new queue is to be processed. This new manifest 806 need only be uploaded to the cloud-based remote monitoring service once. Thereafter, data placed in the new priority queue will be processed by worker role 832 according to the new manifest 806 stored in the customer's manifest assembly 834. For example, the manifest may define where the data is to be stored within cloud storage (e.g., historical data storage 506, an Alarms and Live Data database, etc.), and whether processing of the new data queue is to take priority over other data queues. In some embodiments, the manifest assembly 834 may only accept a new manifest if the manifest is accompanied by a unique key associated with the client.

Once the cloud-based infrastructure has processed and stored the data provided by cloud agent 840 according to the techniques described above, the data can be made accessible to client devices 822 for viewing. Data analysis on the cloud platform 202 can provide a set of web-based and browser enabled technologies for retrieving, directing, and uncompressing the data from the cloud platform 202 to the client devices 822. To this end, reporting services 814 can deliver data in cloud storage (e.g., from historical data storage 506, or controller gain values generated by correlation analytics component 308) to the client devices 822 in a defined format. For example, reporting services 814 can leverage collected data stored in the cloud repository to provide remote operator interfaces to client devices 822 over the Internet. An analytic engine 818 executing on the cloud platform 202—and which may include correlation analytics component 308—can also perform various types of analysis on the data stored in big data storage 812 and provide results to client devices 822.

Figure 11:
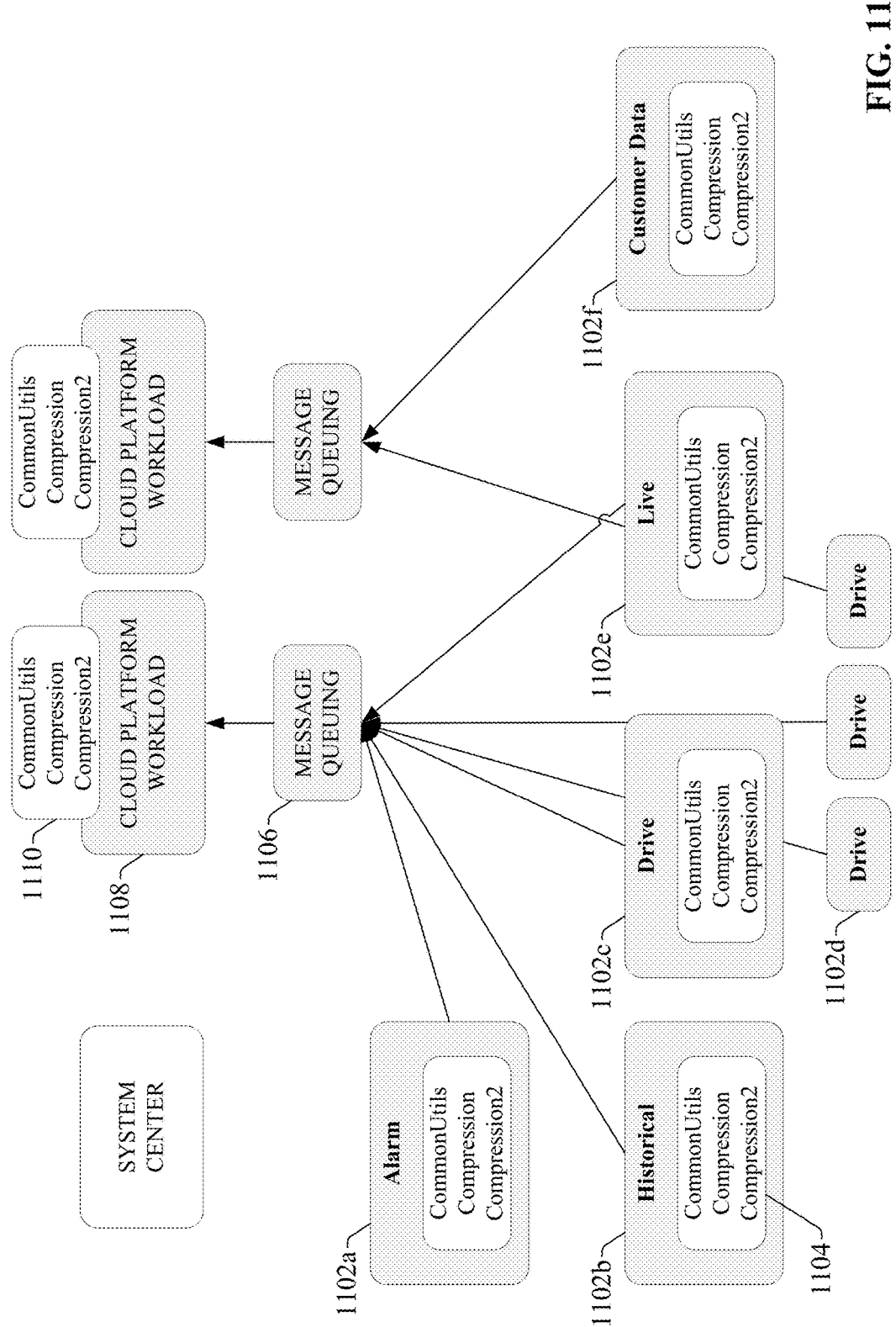
FIG. 11 is a block diagram of an example agent architecture for collection of data from on-premise industrial devices.

FIG. 11 is a block diagram illustrating an example agent architecture for collection of data from on-premise industrial devices according to one or more embodiments. In this example, data is collected from a number of devices and applications 1102 at the customer site, including an alarm database 1102a, data historian 1102b, motor drives 1102c and 1102d, live data server 1102e, and a customer database 1102f. Although these data sources comprise a diverse, heterogeneous collection of devices and applications, collection and pre-processing of data from these sources can be carried out by generic services 1104 (e.g., service libraries). Generic services 1104 can include utilities for identifying the data locations (e.g., devices, applications, tags, registers, etc.) from which data is to be retrieved, utilities for compressing or otherwise pre-processing the data, and providing the data to the message queuing layers 1106 of the cloud agents. The workload services 1108 of the cloud agents can also utilize generic services 1110 to encapsulate and send the data to the cloud fabric. The message queuing layers 1106 and workload services 608 make up the backbone of the decoupled agent architecture.

Figure 12:
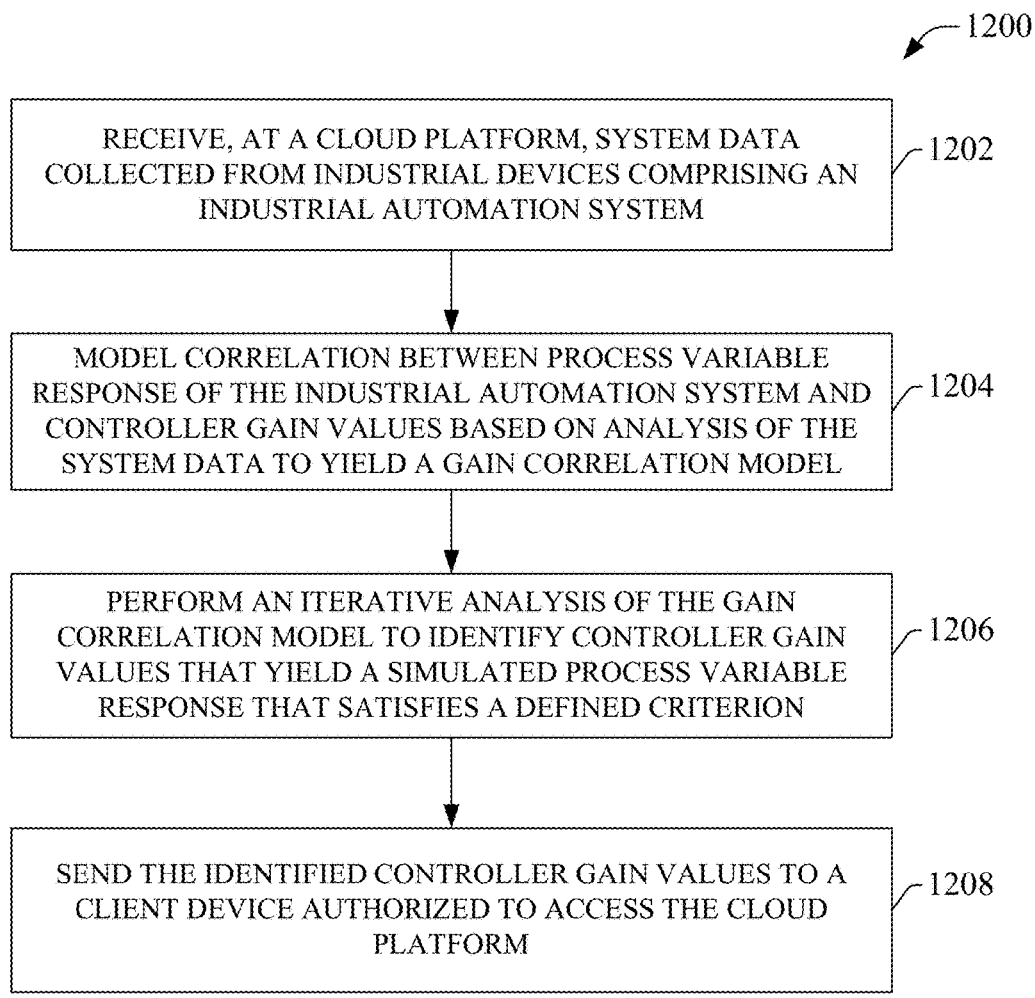
FIG. 12 is a flowchart of an example methodology for tuning controller gains using a cloud-based control loop tuning system.
Figure 13:
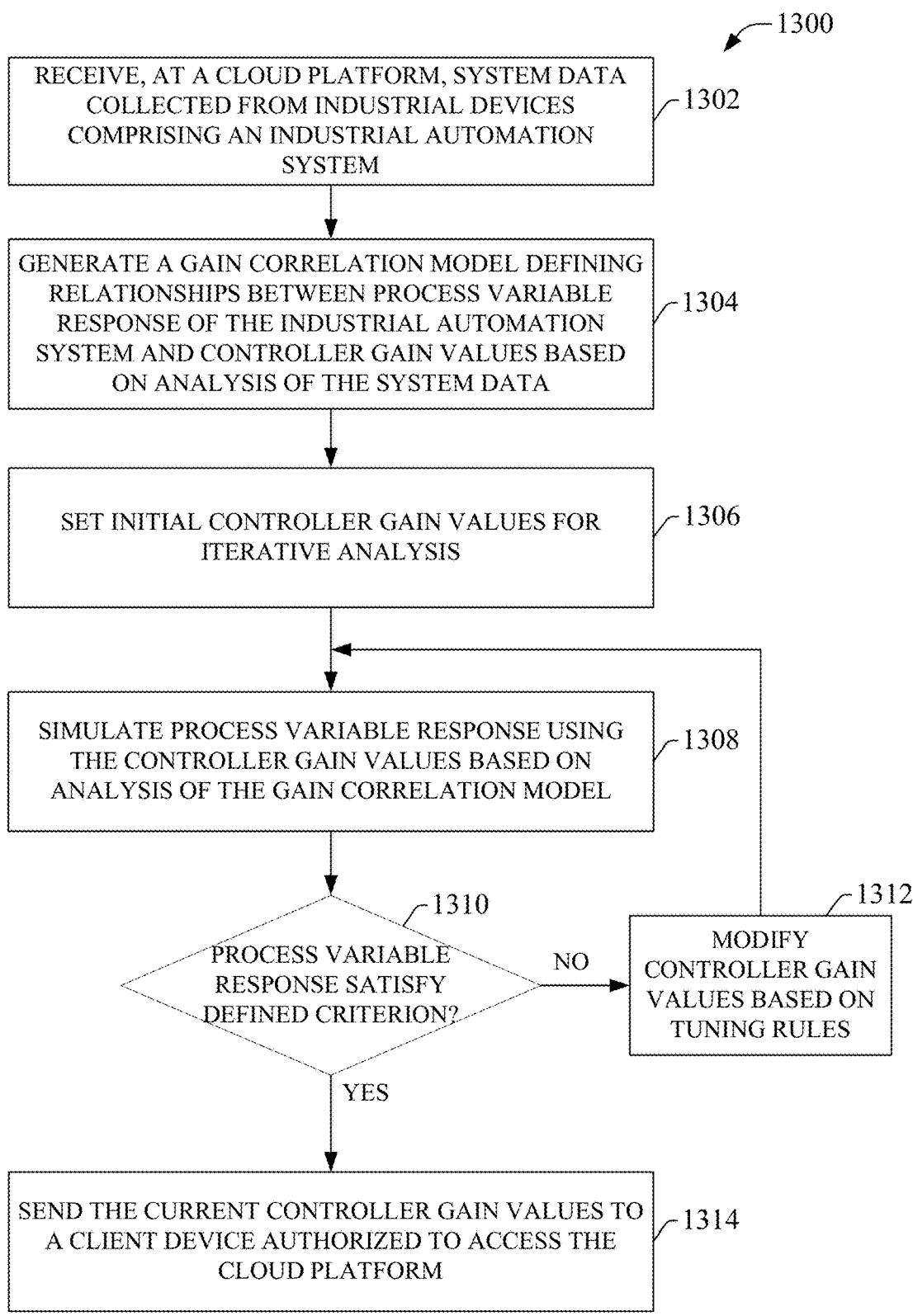
FIG. 13 is a flowchart of an example methodology for applying an iterative analysis technique in a cloud platform to identify substantially optimal controller gains for a closed-loop control system.
Figure 14:
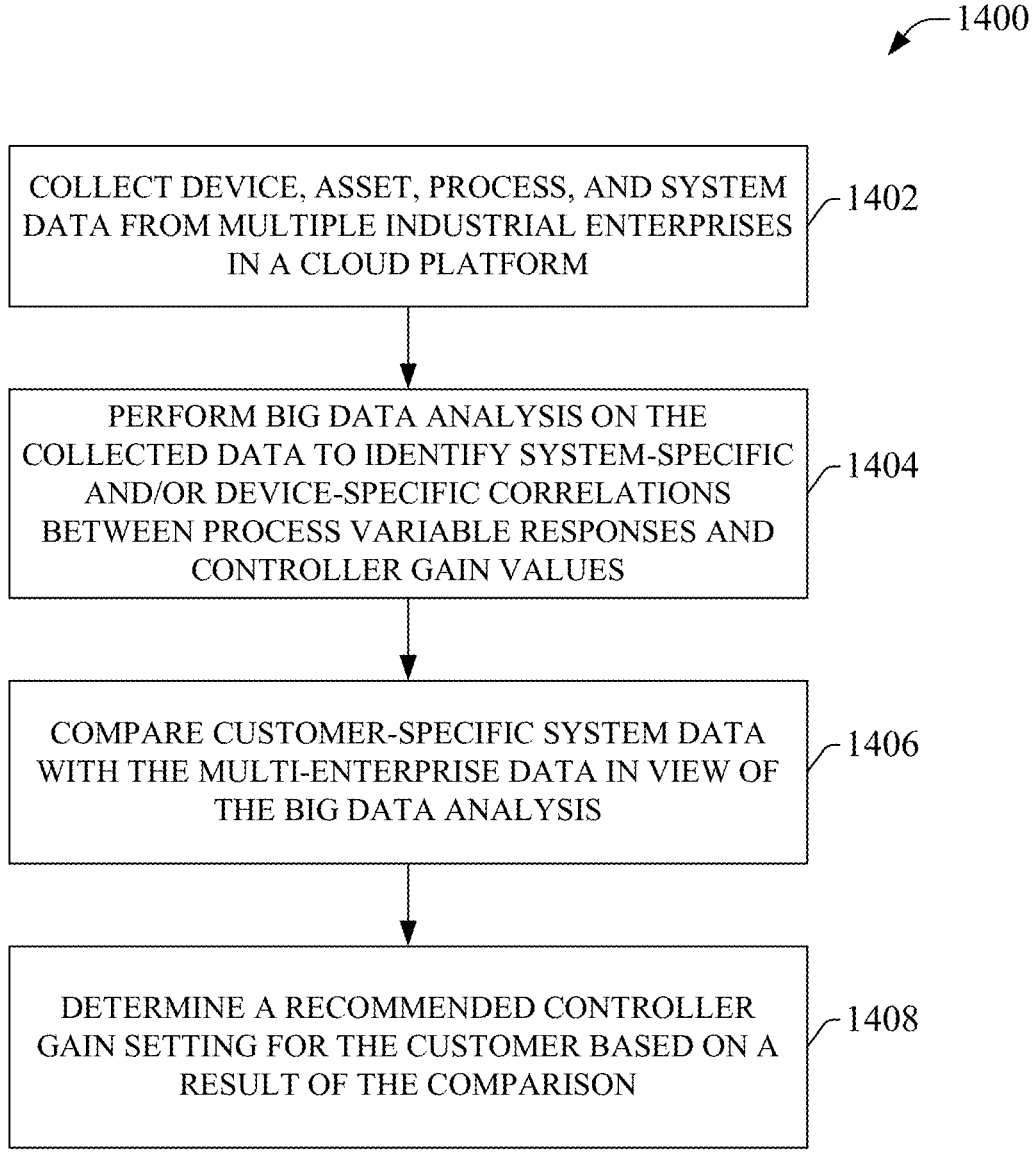
FIG. 14 is a flowchart of an example methodology for generating recommended controller gain values based on collective analysis of multi-enterprise system data in a cloud platform.

FIGS. 12-14 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 12 illustrates an example methodology 1200 for tuning controller gains using a cloud-based control loop tuning system. Initially, at 1202, system data collected from industrial devices comprising an industrial automation system is received at a cloud platform. The industrial automation system includes a closed-loop control system that controls, for example, a speed or position of a motion device or a process variable of a controlled process. The system data can be provided to the cloud platform directly by one or more cloud-capable industrial devices, or can be provided to the cloud platform by one or more cloud agent devices that collect data from the industrial devices and push the data to the cloud platform. The system data can comprise such information as process variable values for a controlled process (e.g., temperatures, pressures, flows, levels, etc.), motion device position and/or velocity data, device configuration information (e.g., variable frequency drive configuration parameters, analog output scale factors configured for an industrial controller, etc.), device or system level faults and alarms, machine cycle time information, calculated KPIs, measured indicators of system performance over time, device or system documentation, device firmware revisions, or other such information relating to configuration and operating characteristics of the industrial automation system.

At 1204, a correlation between process variable response of the industrial automation system and controller gain values is modeled based on analysis of the system data to yield a gain correlation model. The gain correlation model can be incrementally refined as new system data is collected to produce a progressively higher fidelity model over time. At 1206, an iterative analysis of the gain correlation model is performed to identify controller gain values that yield a simulated process variable response that satisfies a defined criterion. At 1208, the controller gains identified at step 1208 are sent to a client device authorized to access the cloud platform. A user of the client device may then choose to implement the identified controller gains on the controller of the industrial automation system.

FIG. 13 illustrates an example methodology 1300 for applying an iterative analysis technique in a cloud platform to identify substantially optimal controller gains for a closed-loop control system. Initially, at 1302, system data collected from industrial devices of an industrial automation system are received at a cloud platform. At 1304, a gain correlation model defining relationships between process variables of the industrial automation system and controller gain values is generated based on analysis of the system data.

At 1306, initial test values for the controller gains are set in preparation for the iterative analysis. At 1308, process variable response is simulated using the controller gain values set at step 1306 based on analysis of the gain correlation model. At 1310, a decision is made regarding whether the process variable response simulated at step 1308 satisfies a defined criterion. The defined criterion can be indicative of optimal system response; e.g., a criterion that suggests a substantially optimal trade-off between fast system response time and system stability for the particular industrial automation system being simulated. If it is determined at 1310 that the process variable response does not satisfy the defined criterion, the methodology moves to step 1312, where the controller gain values are modified based on defined gain tuning rules. The gain tuning rules may specify, for example, how each controller gain should be adjusted as a function of the simulated process variable response, or as a function of the difference between the previous response using previous gain values and the current system response using the current gain values. The methodology then returns to step 1308, where the process variable response is simulated again using the modified controller gain values.

Steps 1308-1312 are repeated until the process variable response is found to satisfy the defined criterion at step 1310, at which time the methodology moves to step 1314, where the current controller gain values are sent to a client device authorized to access the cloud platform. The resulting controller gain values represent recommended gain values provided by the cloud-based tuning system, which can be selectively applied by the end user to the actual control system (e.g., by entering or downloading the recommended gains to the industrial controller).

FIG. 14 illustrates an example methodology 1300 for generating recommended controller gain values based on collective analysis of multi-enterprise system data in a cloud platform. Initially, at 1402, device, asset, process, and/or system data is collected from multiple industrial enterprises in a cloud platform. At 1404, big data analysis is performed on the collected data to identify system-specific and/or device-specific correlations between process variables responses and controller gain values. For example, subsets of the collected data relating to the use of certain industrial assets (e.g., specific types of industrial controllers, motion devices, mechanical couplings, etc.) to carry out a particular type of control application are analyzed, and correlations between controller gain values and process variable response for these types of systems are identified based on the analysis.

At 1406, customer-specific system data for a particular industrial enterprise (customer) is compared with the multi-enterprise data collected at step 1402. The comparison is made in view of the analysis results obtained at 1404, so that a determination can be made regarding whether the customer's control performance can be improved by re-tuning the customer's current controller gain settings. For example, the customer's current controller gain settings can be compared with the controller gain values determined to be optimal based on collective analysis of similarly configured industrial applications (e.g., control systems that control a similar process, motion device, or machine; similar motor drives; similar controllers, similar control programming, etc.). At 1408, recommended controller gain settings are determined for the customer based on a result of the comparison.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 15:
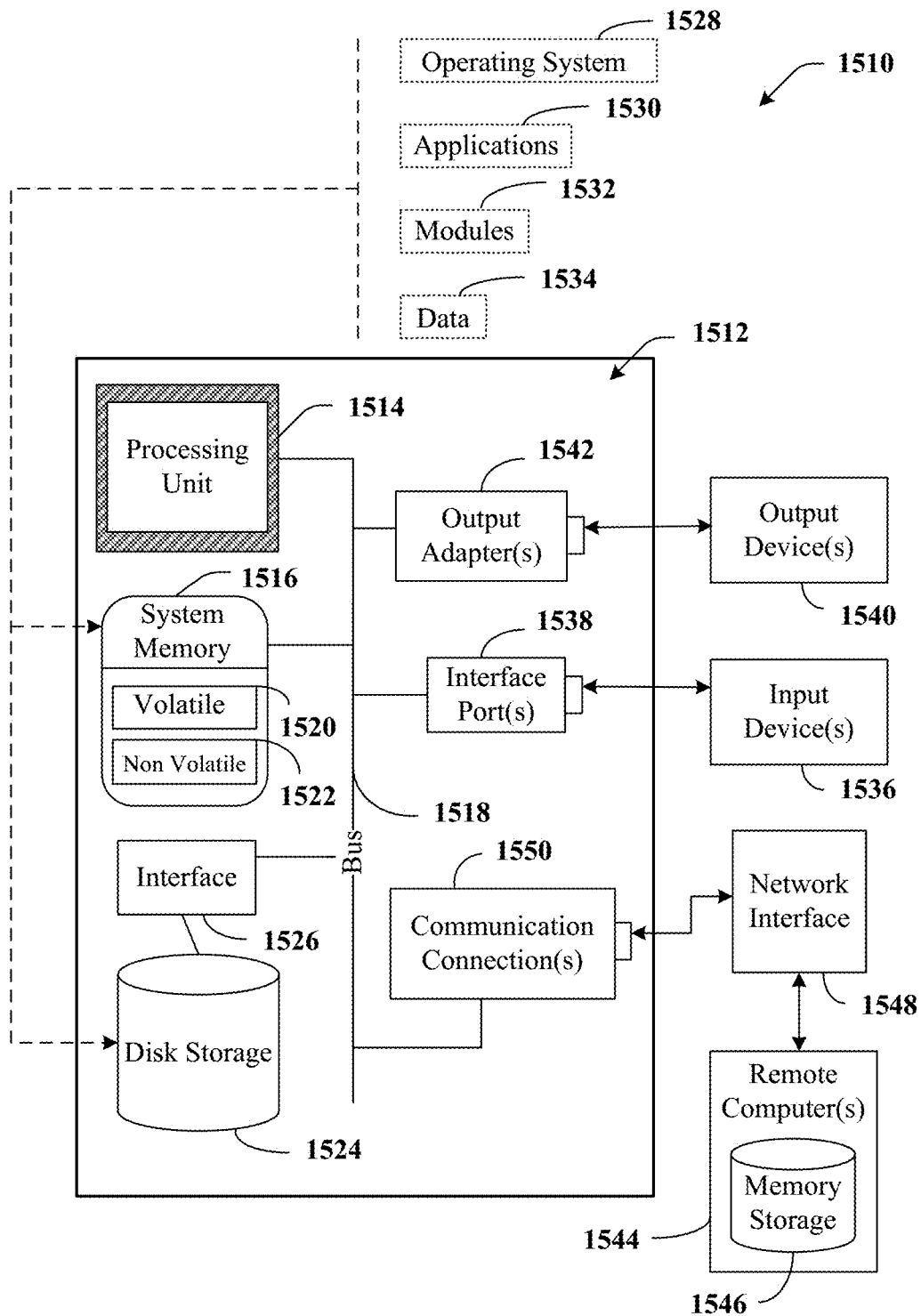
FIG. 15 is an example computing environment.
Figure 16:
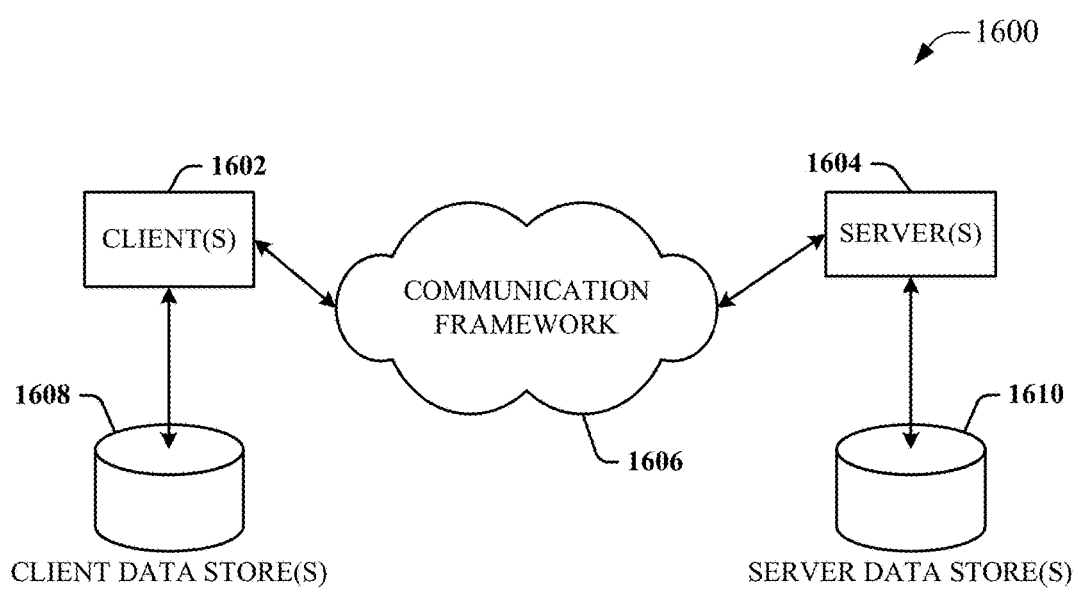
FIG. 16 is an example networking environment.

In order to provide a context for the various aspects of the disclosed subject matter, FIGS. 15 and 16 as well as the following discussion are intended to provide a brief, general description of a suitable environment in which the various aspects of the disclosed subject matter may be implemented.

With reference to FIG. 15, an example environment 1510 for implementing various aspects of the aforementioned subject matter includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Multi-core microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable PROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/non-removable, volatile/non-volatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer 1512. System applications 1530 take advantage of the management of resources by operating system 1528 through program modules 1532 and program data 1534 stored either in system memory 1516 or on disk storage 1524. It is to be appreciated that one or more embodiments of the subject disclosure can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapters 1542 are provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 2246 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the system bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

FIG. 16 is a schematic block diagram of a sample computing environment 1600 with which the disclosed subject matter can interact. The sample computing environment 1600 includes one or more client(s) 1602. The client(s) 1602 can be hardware and/or software (e.g., threads, processes, computing devices). The sample computing environment 1600 also includes one or more server(s) 1604. The server(s) 1604 can also be hardware and/or software (e.g., threads, processes, computing devices). The servers 1604 can house threads to perform transformations by employing one or more embodiments as described herein, for example. One possible communication between a client 1602 and servers 1604 can be in the form of a data packet adapted to be transmitted between two or more computer processes. The sample computing environment 1600 includes a communication framework 1606 that can be employed to facilitate communications between the client(s) 1602 and the server(s) 1604. The client(s) 1602 are operably connected to one or more client data store(s) 1608 that can be employed to store information local to the client(s) 1602. Similarly, the server(s) 1604 are operably connected to one or more server data store(s) 1610 that can be employed to store information local to the servers 1604.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for tuning controller gain values on a cloud platform, comprising:
    a memory that stores executable components;
    a processor, operatively coupled to the memory, that executes the executable components, the executable components comprising:
        a system interface component configured to collect first industrial data from a first set of devices of a first industrial control system and store the first industrial data in a selected priority queue, of multiple priority queues, configured on a cloud platform;
        a gain modeling component configured to discover a correlation between controller gain values and values of a process variable of the first industrial control system based on an analysis of the first industrial data and second industrial data collected from a second set of devices of a second industrial control system, and to generate a gain correlation model that defines the process variable as a function of controller gain values based on the correlation, wherein the gain modeling component selects the second industrial data for the analysis based on a determination that the second industrial control system executes a similar type of industrial application as an industrial application executed by the first industrial control system, and wherein the similar type of industrial application is at least one of a robot control application, a spinning load application, a conveyor control application, or a web tension control application;
        a correlation analytics component configured to determine at least one controller gain value for the first industrial control system based on analysis of the gain correlation model; and
    a cloud interface component configured to set the at least one controller gain value in an industrial controller of the first industrial control system to facilitate tuning the industrial controller, wherein tuning the industrial controller causes the industrial controller to execute the industrial application in accordance with the at least one controller gain value.

2. The system of claim 1, further comprising a client interface component configured to send the at least one controller gain value to a client device communicatively connected to the cloud platform.

3. The system of claim 1, wherein the gain modeling component is configured to generate the gain correlation model based on multi-enterprise industrial data collected from multiple industrial control systems, including the first industrial control system and the second industrial control system, associated with multiple industrial enterprises.

4. The system of claim 1, wherein the correlation analytics component is configured to simulate, based on the gain correlation model, a process variable response using at least one test value of the at least one controller gain.

5. The system of claim 4, wherein the correlation analytics component is configured to modify the at least one test value as a function of the process variable response based on one or more gain tuning rules to yield at least one modified test value, and to re-simulate the process variable response for the at least one modified test value to yield a new process variable response.

6. The system of claim 5, wherein the correlation analytics component is configured to iteratively modify the at least one test value to yield the at least one modified test value and re-simulate the process variable response for the at least one modified test value, and to select, as the at least one controller gain value, the at least one modified test value in response to a determination that the new process variable response for the at least one modified test value satisfies a defined criterion.

7. The system of claim 1, wherein the system interface component is configured to receive at least a portion of the first industrial data as a data packet from a cloud agent device associated with one or more of the first set of devices, and the data packet comprises header information identifying at least one of an owner of the first industrial control system, a site at which the first industrial control system is located, a priority of the portion of the first industrial data, a message type of the data packet, or a process identifier specifying a type of processing to be performed on the portion of the first industrial data.

8. The system of claim 1, wherein the first industrial data comprises at least one of monitored process variable values for the first industrial control system, position data or velocity data for a motion device, configuration information for one or more of the first set of devices, device alarm data, system alarm data, machine cycle time data, a performance indicator for the first industrial control system, or firmware information for at least one of the first set of devices.

9. The system of claim 1, further comprising a manifest assembly repository configured to maintain manifest data that defines, for respective priority queues of the multiple priority queues, customer-specific preferences relating to processing of data received at the cloud platform and assigned to the multiple priority queues,
wherein the manifest data is uploaded to the cloud platform via a cloud agent device at a plant facility, and wherein the customer-specific preferences define, for the selected priority queue, at least a processing priority for the first industrial data, an upload frequency for the first industrial data, and an indication of a storage location within the cloud storage for the first industrial data.

10. The system of claim 1, wherein the process variable is at least one of a temperature, a pressure, a flow, a level, a motion device position, or a motion device velocity.

11. A method for tuning an industrial control loop, comprising:
receiving, at a cloud platform by a system comprising at least one processor, first industrial data from one or more first industrial devices of a first industrial control system;
storing, by the system, the first industrial data in a priority queue, of multiple priority queues, configured on the cloud platform;
selecting, by the system, second industrial data collected from one or more second industrial devices of a second industrial control system based on a determination that the second industrial control system implements a first industrial application having a similar type as a second industrial application executed by the first industrial control system, wherein the similar type is at least one of a robot control application, a spinning load application, a conveyor control application, or a web tension control application;
discovering, by the system, a correlation between controller gain values and process variable values of the first industrial control system based on a first analysis of the first industrial data and the second industrial data;
creating, by the system, a gain correlation model defining, based on the correlation, the process variable values as a function of the controller gain values, and storing the gain correlation model on cloud storage of the cloud platform, wherein the gain correlation model encodes the correlation between the controller gain values and the process variable values of the first industrial control system;
determining, by the system, at least one controller gain value for the first industrial control system based on a second analysis of the gain correlation model;
setting, by the system, the at least one controller gain value in an industrial controller to facilitate tuning the industrial controller; and
executing the industrial controller to control the industrial application in accordance with the at least one controller gain value.

12. The method of claim 11, further comprising sending the at least one controller gain value to a specified client device that has authorization to access the cloud platform.

13. The method of claim 11, wherein the creating comprises creating the gain correlation model based on multi-enterprise industrial data collected from multiple industrial control systems, including the first industrial control system and the second industrial control system, associated with multiple industrial enterprises.

14. The method of claim 11, wherein the determining comprises simulating a process variable response based on the correlation gain model using at least one test value of the at least one controller gain.

15. The method of claim 14, wherein the determining further comprises:
modifying the at least one test value as a function of the process variable response based on one or more gain tuning rules resulting in at least one modified test value; and
repeating the simulating using the at least one modified test value resulting in a new process variable response.

16. The method of claim 15, further comprising: repeating the modifying and the repeating until the new process variable response satisfies a defined criterion; and
setting, as the at least one controller value, the at least one modified test value that resulted in the new process variable response that satisfied the defined criterion.

17. The method of claim 11, wherein the receiving comprises:
receiving at least a portion of the first industrial data as a data packet from a cloud agent device associated with the one or more first industrial devices; and processing the data packet in accordance with header information included in the data packet, wherein the header information specifies at least one of an owner of the first industrial control system, a site at which the first industrial control system is located, a priority of the portion of the first industrial data, a message type of the data packet, or a process identifier specifying a type of processing to be performed on the portion of the first industrial data.

18. A non-transitory computer-readable medium having stored thereon instructions that, in response to execution, cause a system comprising a processor to perform operations, the operations comprising:

receiving, via a cloud platform, first industrial data from one or more first industrial devices of a first industrial control system;

storing the first industrial data in a priority queue of multiple priority queues configured on the cloud platform;

selecting second industrial data received from one or more second industrial devices of a second industrial control system based on a determination that the second industrial control system executes a similar type of industrial application as an industrial application executed by the first industrial control system, wherein the similar type of industrial application comprises at least one of a robot control application, a spinning load application, a conveyor control application, or a web tension control application;

discovering a correlation between controller gain values and process variable values of the first industrial control system based on a first analysis of the first industrial data and the second industrial data;

generating, based on a result of the first analysis, a gain correlation model and storing the gain correlation model on cloud storage of the cloud platform, wherein the gain correlation model defines the process variable values as a function of the controller gain values;

generating at least one controller gain value for the first industrial control system based on a second analysis of the gain correlation model;

tuning an industrial controller of the first industrial control system using the at least one controller gain value; and initiating control of the industrial application by the industrial controller in accordance with the at least one controller gain value.

19. The non-transitory computer-readable medium of claim 18, wherein the generating the at least one controller gain value comprises:

simulating a process variable response based on the correlation gain model using at least one test value of the at least one controller gain;

modifying the at least one test value as a function of the process variable response based on one or more gain tuning rules to yield at least one modified test value;

repeating the simulating using the at least one modified test value to yield a new process variable response until the new process variable response satisfies a defined criterion; and setting, as the at least one controller value, the at least one modified test value that resulted in the new process variable response that satisfied the defined criterion.

20. The non-transitory computer-readable medium of claim 18, wherein the receiving comprises:

receiving at least a portion of the first industrial data as a data packet from a cloud agent device associated with the one or more first industrial devices; and processing the data packet based on header information included in the data packet, wherein the header information specifies at least one of an owner of the first industrial control system, a site at which the first industrial control system is located, a priority of the portion of the first industrial data, a message type of the data packet, or a process identifier specifying a type of processing to be performed on the portion of the first industrial data.

* * * * *